(12) United States Patent
Walton et al.

(10) Patent No.: US 6,751,187 B2
(45) Date of Patent: Jun. 15, 2004

(54) METHOD AND APPARATUS FOR PROCESSING DATA FOR TRANSMISSION IN A MULTI-CHANNEL COMMUNICATION SYSTEM USING SELECTIVE CHANNEL TRANSMISSION

(75) Inventors: Jay R. Walton, Westford, MA (US); John W. Ketchum, Harvard, MA (US)

(73) Assignee: Qualcomm Incorporated, San Diego, CA (US)

( * ) Notice: Subject to any disclaimer, the term of this patent is extended or adjusted under 35 U.S.C. 154(b) by 207 days.

(21) Appl. No.: 09/892,379

(22) Filed: Jun. 26, 2001

(65) Prior Publication Data

US 2003/0043732 A1 Mar. 6, 2003

Related U.S. Application Data

(63) Continuation-in-part of application No. 09/860,274, filed on May 17, 2001.

(51) Int. Cl.[7] .............................. H04J 11/00; H04J 3/16; H04Q 7/00
(52) U.S. Cl. ..................... 370/210; 370/334; 370/437; 375/346; 455/522
(58) Field of Search ................................ 370/208, 210, 370/468, 431, 464, 465, 335, 334, 328; 375/225, 299, 346; 455/13.4, 522; 714/786, 790

(56) References Cited

U.S. PATENT DOCUMENTS

| | | | |
|---|---|---|---|
| 5,056,109 A | 10/1991 | Gilhousen et al. | |
| 5,210,771 A | 5/1993 | Schaeffer et al. | ............... 375/1 |
| 5,265,119 A | 11/1993 | Gilhousen et al. | |
| 5,625,876 A | * | 4/1997 | Gilhousen et al. ......... 455/33.3 |
| 5,799,005 A | 8/1998 | Soliman | |
| 5,903,554 A | 5/1999 | Saints | |
| 6,038,450 A | * | 3/2000 | Brink et al. ................. 455/442 |
| 6,097,972 A | 8/2000 | Saints et al. | |
| 6,144,646 A | 11/2000 | Bohlmann et al. .......... 370/311 |
| 6,167,031 A | 12/2000 | Olofsson et al. ............ 370/252 |
| 6,205,190 B1 | * | 3/2001 | Antonio et al. ............. 375/346 |
| 6,442,214 B1 | * | 8/2002 | Boleskei et al. ............ 375/299 |

FOREIGN PATENT DOCUMENTS

| | | |
|---|---|---|
| WO | 0038351 | 6/2000 |
| WO | 0101722 | 1/2001 |

OTHER PUBLICATIONS

Fuyun Ling "Optimal Reception, Performance Bound, and Cutoff Rate Analysis of References–Assisted Coherent CDMA Communications with Applications," IEEE Transactions on Communications, vol. 47, No. 10, Oct. 1999.

* cited by examiner

*Primary Examiner*—Duc Ho
(74) *Attorney, Agent, or Firm*—Philip Wadsworth; Thien T. Nguyen; Thomas R. Rouse

(57) ABSTRACT

Techniques to select transmission channels for use for data transmission and to process and transmit data over the selected transmission channels. Transmission channels available for use are segregated into one or more groups, with each group including any number of channels. With selective channel transmission, only "good" channels in each group are selected (e.g., based on the channels' received SNRs and an SNR threshold), "bad" channels are not used, and the total available transmit power for the group is (e.g., uniformly) distributed across only the good channels. Each group may also be associated with a respective coding and modulation scheme, and data for each group may be coded and modulated based on the scheme selected for the group. Improved performance is achieved by using only good channels in each group and matching the data processing for the selected channels to the capacity achievable by the channels.

33 Claims, 10 Drawing Sheets

METHOD AND APPARATUS FOR PROCESSING DATA FOR TRANSMISSION IN A MULTI-CHANNEL COMMUNICATION SYSTEM USING SELECTIVE CHANNEL TRANSMISSION

CROSS REFERENCE

This application is a continuation-in-part of co-pending U.S. application Ser. No. 09/860,274, filed May 17, 2001, entitled "Method and Apparatus for Processing Data For Transmission In A Multi-Channel Communication System Using Selective Channel Inversion."

BACKGROUND

1. Field

The present invention relates generally to data communication, and more specifically to techniques for processing data for transmission in a wireless communication system using selective channel transmission and defined (e.g., uniform) transmit power allocation.

2. Background

A multi-channel communication system is often deployed to provide increased transmission capacity for various types of communication such as voice, data, and so on. Such a multi-channel system may be a multiple-input multiple-output (MIMO) communication system, an orthogonal frequency division modulation (OFDM) system, a MIMO system that utilizes OFDM, or some other type of system. A MIMO system employs multiple transmit antennas and multiple receive antennas to exploit spatial diversity to support a number of spatial subchannels, each of which may be used to transmit data. An OFDM system effectively partitions the operating frequency band into a number of frequency subchannels (or frequency bins), each of which is associated with a respective subcarrier on which data may be modulated. A multi-channel communication system thus supports a number of "transmission" channels, each of which may correspond to a spatial subchannel in a MIMO system, a frequency subchannel in an OFDM system, or a spatial subchannel of a frequency subchannel in a MIMO system that utilizes OFDM.

The transmission channels of a multi-channel communication system typically experience different link conditions (e.g., due to different fading and multipath effects) and may achieve different signal-to-noise-plus-interference ratios (SNRs). Consequently, the transmission capacities (i.e., the information bit rates) that may be supported by the transmission channels for a particular level of performance may be different from channel to channel. Moreover, the link conditions typically vary over time. As a result, the bit rates supported by the transmission channels also vary with time.

The different transmission capacities of the transmission channels plus the time-variant nature of these capacities make it challenging to provide an effective coding and modulation scheme capable of processing data prior to transmission on the channels. Moreover, for practical considerations, the coding and modulation scheme should be simple to implement and utilize at both the transmitter and receiver systems.

There is therefore a need in the art for techniques to effectively and efficiently process data for transmission on multiple transmission channels with different capacities to improve performance and reduce complexity.

SUMMARY

Aspects of the invention provide techniques to select transmission channels for use for data transmission and to process and transmit data over the selected transmission channels. In certain embodiments, the transmission channels available for use may be segregated into one or more groups, with each group including any number of transmission channels. For a MIMO system that utilizes OFDM, the available transmission channels correspond to the spatial subchannels and frequency subchannels, each group may correspond to, for example, a respective transmit antenna, and the transmission channels in each group may be the frequency subchannels for the corresponding transmit antenna.

In an aspect, which is referred to as selective channel transmission (SCT), only "good" transmission channels in each group are selected for use for data transmission, and "bad" transmission channels are not used. The good transmission channels may be defined as those having SNRs or power gains at or above a particular SNR or power gain threshold. The total available transmit power for each group is then distributed amongst the good transmission channels in accordance with a defined allocation scheme. In an embodiment, the defined allocation scheme uniformly distributes the total available transmit power amongst the good transmission channels. Other allocation schemes may also be used.

In another aspect, the selective channel transmission may be used in conjunction with common coding and modulation, which would then simplify the coding/modulation at a transmitter system and the complementary demodulation/decoding at a receiver system. Each group of transmission channels may be associated with a respective coding and modulation scheme, and data for each group may be coded and modulated based on the scheme selected for the group. Each group may thus be associated with (1) a respective (e.g., SNR or power gain) threshold used to select transmission channels for use for data transmission and (2) a respective coding and modulation scheme used to process data for the group.

The selective channel transmission may provide improved performance due to the combined benefits of (1) using only the best transmission channels in each group, which are selected from among all available transmission channels in the group, (2) allocating the total available transmit power amongst only the selected transmission channels, and (3) matching the data processing for the selected transmission channels to the capacity achievable for these channels.

The invention further provides methods, systems, and apparatus that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Various aspects, embodiments, and features of the invention may be applied to any multi-channel communication system in which multiple transmission channels are available for data transmission. Such multi-channel communication systems include multiple-input multiple-output (MIMO) systems, orthogonal frequency division modulation (OFDM) systems, MIMO systems that utilize OFDM, and others. The multi-channel communication systems may also implement code division multiple access (CDMA), time division multiple access (TDMA), frequency division multiple access (FDMA), or some other multiple access techniques. Multiple access techniques can be used to support concurrent communication with a number of terminals.

Figure 1:
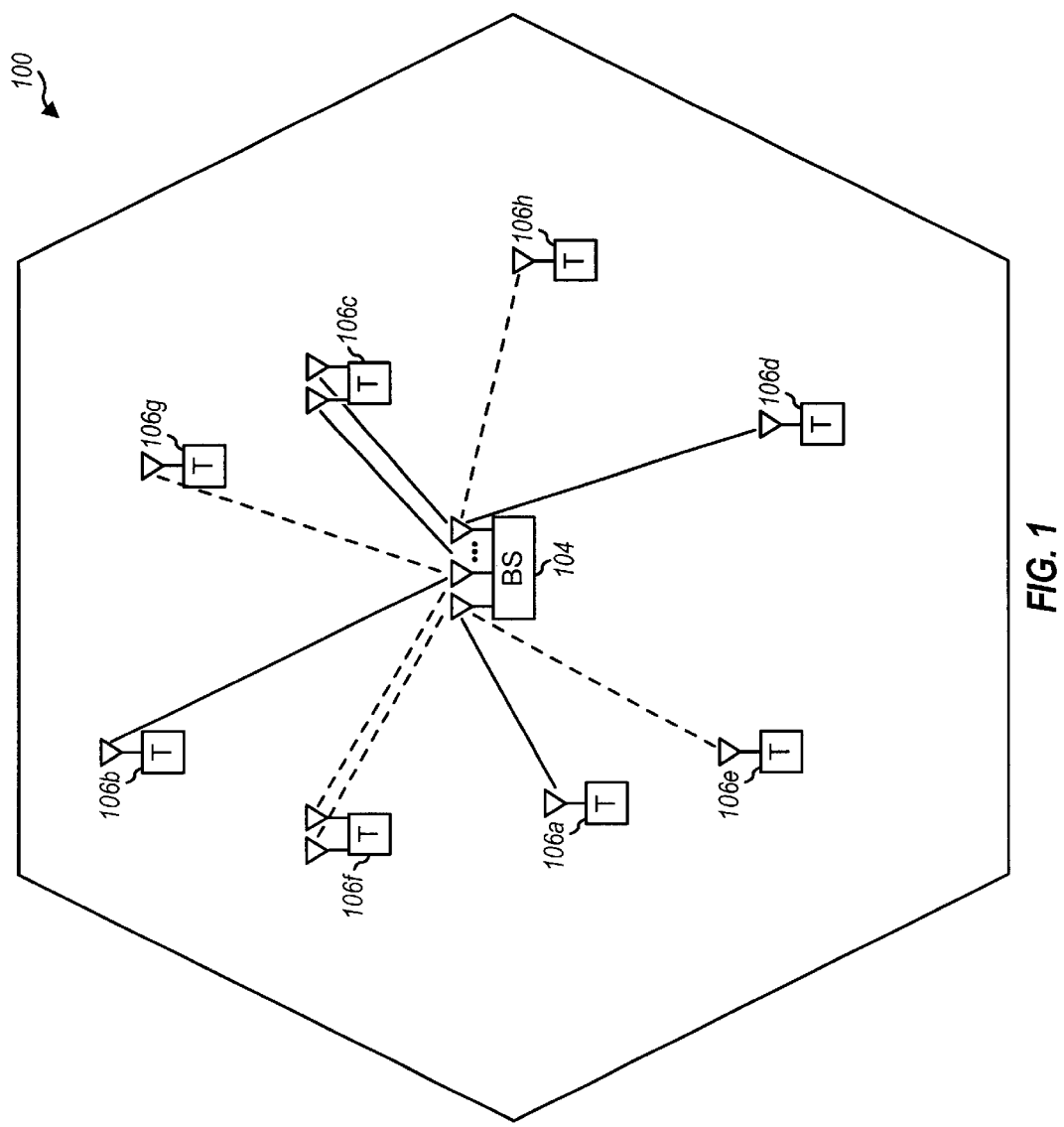
FIG. 1 is a diagram of a multiple-input multiple-output (MIMO) communication system that may be designed and operated to implement various aspects and embodiments of the invention.

FIG. 1 is a diagram of a multiple-input multiple-output (MIMO) communication system 100 that may be designed and operated to implement various aspects and embodiments of the invention. MIMO system 100 employs multiple ($N_T$) transmit antennas and multiple ($N_R$) receive antennas for data transmission. MIMO system 100 is effectively formed for a multiple access communication system having a base station (BS) 104 that concurrently communicates with a number of terminals (T) 106. In this case, base station 104 employs multiple antennas and represents the multiple-input (MI) for uplink transmissions and the multiple-output (MO) for downlink transmissions. The downlink (i.e., forward link) refers to transmissions from the base station to the terminals, and the uplink (i.e., reverse link) refers to transmissions from the terminals to the base station.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_C$ independent channels, with $N_C \leq \min \{N_T, N_R\}$. Each of the $N_C$ independent channels is also referred to as a spatial subchannel of the MIMO channel and corresponds to a dimension. In one common MIMO system implementation, the $N_T$ transmit antennas are located at and associated with a single transmitter system, and the $N_R$ receive antennas are similarly located at and associated with a single receiver system. A MIMO system may also be effectively formed for a multiple access communication system having a base station that concurrently communicates with a number of terminals. In this case, the base station is equipped with a number of antennas and each terminal may be equipped with one or more antennas.

An OFDM system effectively partitions the operating frequency band into a number of ($N_F$) frequency subchannels (i.e., frequency bins or subbands). At each time slot, a modulation symbol may be transmitted on each of the $N_F$ frequency subchannels. Each time slot corresponds to a particular time interval that may be dependent on the bandwidth of the frequency subchannel.

A multi-channel communication system may be operated to transmit data via a number of transmission channels. For a MIMO system not utilizing OFDM, there is typically only one frequency subchannel and each spatial subchannel may be referred to as a transmission channel. For a MIMO system utilizing OFDM, each spatial subchannel of each frequency subchannel may be referred to as a transmission channel. And for an OFDM system not utilizing MIMO, there is only one spatial subchannel for each frequency subchannel and each frequency subchannel may be referred to as a transmission channel.

The transmission channels in a multi-channel communication system typically experience different link conditions (e.g., due to different fading and multipath effects) and may achieve different signal-to-noise-plus-interference ratios (SNRs). Consequently, the capacity of the transmission channels may be different from channel to channel. This capacity may be quantified by the information bit rate (i.e., the number of information bits per modulation symbol) that may be transmitted on a transmission channel for a particular level of performance (e.g., a particular bit error rate (BER) or packet error rate (PER)). Since the link conditions typically vary with time, the supported information bit rates for the transmission channels also vary with time.

To more fully utilize the capacity of the transmission channels, channel state information (CSI) descriptive of the link conditions may be determined (typically at the receiver system) and provided to the transmitter system. The transmitter system may then process (e.g., encode, modulate, and weight) data such that the transmitted information bit rate for each transmission channel matches the transmission capacity of the channel. CSI may be categorized as either "full CSI" or "partial CSI". Full CSI includes sufficient characterization (e.g., the amplitude and phase) across the entire system bandwidth for the propagation path between each transmit-receive antenna pair in a $N_T \times N_R$ MIMO matrix (i.e., the characterization for each transmission channel). Partial CSI may include, for example, the SNRs of the transmission channels.

In accordance with an aspect of the invention, techniques are provided to (1) determine a set of transmission channels to be used for a data transmission, with the set including all or a subset of the transmission channels available for use, (2) allocate the total available transmit power to the selected transmission channels in a defined manner, and (3) process data for all selected transmission channels based on one or more coding and modulation schemes, which may be determined based in part on the particular transmit power allocated to the selected transmission channels. Using selective channel transmission, only "good" transmission channels having transmission capacities (e.g., received SNRs or power gains) at or above a particular (SNR or power gain) threshold are selected for use for data transmission, and "bad" transmission channels are not used. The total available transmit power is then allocated amongst the good transmission channels in a defined manner (e.g., uniformly).

In another aspect, the available transmission channels are segregated into groups and the selective channel transmission is applied independently to each group of channels. For example, the frequency subchannels of each transmit antenna may be grouped together, and the selective channel transmission may be applied independently for each of the transmit antennas. This segregation permits the optimization to be achieved on a per group (e.g., per transmit antenna) basis.

The selective channel transmission techniques may be advantageously used when full or partial CSI is available at the transmitter. These techniques may be used on conjunction with a common coding and modulation scheme, in which case much of the complexity associated with the channel-specific coding and modulation technique described above may be ameliorated, while still achieving high performance. The selective channel transmission techniques may also provide improved performance over the channel-specific coding and modulation technique due to the combined benefits of (1) using only the $N_U$ best transmission channels selected from amongst the available transmission channels and (2) approximately matching the coding and modulation to the SNRs achieved for the selected transmission channels.

For a MIMO system utilizing OFDM and having full CSI available, the transmitter system may have knowledge of the complex-valued gain of the transmission path between each transmit-receive antenna pair of each frequency subchannel. This information may be used to render the MIMO channel orthogonal so that each eigenmode (i.e., spatial subchannel) may be used for an independent data stream.

For a MIMO system utilizing OFDM and having partial CSI available, the transmitter may have limited knowledge of the transmission channels. Independent data streams may be transmitted on corresponding transmission channels over the available transmit antennas, and the receiver system may use a particular linear (spatial) or non-linear (space-time) processing technique (i.e., equalization) to separate out the data streams. The equalization provides a data stream corresponding to each transmission channel (e.g., each transmit antenna and/or each frequency subchannel), and each data stream has an associated SNR.

If the set of SNRs for the transmission channels is available at the receiver system, this information may be used to distribute the total available transmit power amongst the selected transmission channels and to select the proper coding and modulation scheme. In an embodiment, the available transmission channels in each group are ranked in order of decreasing received SNR, and the total available transmit power is allocated to and used for the $N_U$ best transmission channels in the group. In an embodiment, transmission channels having received SNRs that fall below a particular SNR threshold are not selected for use. The SNR threshold may be selected to optimize throughput or some other criteria. The total available transmit power for each group is allocated to the selected transmission channels in the group in a defined manner (e.g., uniformly) such that high performance may be achieved. Similar processing may be performed if the channel gains (instead of the SNRs) are available at the transmitter system. In an embodiment, a common coding scheme (e.g., a particular Turbo code of a particular code rate) and a common modulation scheme (e.g., a particular PSK or QAM constellation) are used for all selected transmission channels in each group.

Selective Channel Transmission

If a simple (common) coding and modulation scheme can be used at the transmitter system for each group of transmission channels, then a single (e.g., convolutional or Turbo) coder and code rate may be used to encode data for all selected transmission channels in the group, and the resultant coded bits may be mapped to modulation symbols using a single (e.g., PSK or QAM) modulation scheme. The resultant modulation symbols are then all drawn from the same "alphabet" of possible modulation symbols and encoded with the same code and code rate. This would then simplify the data processing at both the transmitter and receiver.

However, the transmission channels in a multi-channel communication system typically experience different link conditions and achieve different SNRs. In this case, if all available transmission channels are used for data transmission and the same amount of transmit power is used for each selected transmission channel, then the transmitted modulation symbols will be received at different SNRs depending on the specific channels on which the modulation symbols are transmitted. If all available transmission channels are used, then the result may be a large variation in symbol error probability over the set of transmission channels, and an associated loss in bandwidth efficiency.

In accordance with an aspect of the invention, techniques are provided to selected a set of transmission channels for used for data transmission and to allocate the total available transmit power to the selected transmission channels in a defined manner to achieve high performance while reducing implementation complexity. In an embodiment, a single coding and modulation scheme is used for all selected transmission channels in each group. This coding and modulation scheme may be selected based on the distribution of SNRs achieved at the receiver system for the selected transmission channels. The use of a single coding and modulation scheme for each group greatly reduces the complexity of the coding/modulation process at the transmitter system and the complementary demodulation/decoding process at the receiver system.

If equal amount of transmit power is used for all available transmission channels in a MIMO system utilizing OFDM, then the received power for a particular channel may be expressed as:

$$P_{rx}(j,k) = \frac{P_{tx\_total}}{N_T N_F}|H(j,k)|^2, \qquad \text{Eq (1)}$$

where $P_{rx}(j,k)$ is the received power for transmission channel (j,k) (i.e., the j-th spatial subchannel of the k-th frequency subchannel), $P_{tx\_total}$ is the total transmit power available at the transmitter, $N_T$ is the number of transmit antennas, $N_F$ is the number of frequency subchannels, and $H(j,k)$ is the complex-valued "effective" channel gain from the transmitter to the receiver for transmission channel (j,k).

Equation (1) shows that the receive power for each transmission channel is dependent on the power gain of that channel, i.e., $|H(j,k)|^2$. For simplicity, the channel gain $H(j,k)$ includes the effects of the processing at the transmitter and receiver. Also for simplicity, it is assumed that the number of spatial subchannels is equal to the number of transmit antennas and $N_T \cdot N_F$ represents the total number of available transmission channels. If equal amount of power is transmitted for all available transmission channels, then the total received power $P_{rx\_total}$ for all channels may be expressed as:

$$P_{rx\_total} = \sum_{j=1}^{N_T} \sum_{k=1}^{N_F} \frac{P_{tx}}{N_T N_F} |H(j,k)|^2. \quad \text{Eq (2)}$$

If equal transmit power is used for all available transmission channels regardless of their channel gains, then the poor transmission channels would achieve worse received SNR. In fact, to achieve a particular received SNR, the poorer a transmission channel gets the more transmit power needs to be allocated to this channel. When one or more transmission channels become excessively poor, the SNR for these channels may be such that reliable data transmission cannot be supported, which may then dramatically decrease the overall system throughput if these channels are used.

In an aspect, the available transmission channels in each group are selected for use based on their transmission capacities, and only channels whose capacities (e.g., as determined by the received power or SNRs) are at or above a particular threshold, $\alpha$, relative to the total capacity are selected for use. Conversely, transmission channels whose capacities fall below this threshold are erased (i.e., not used). For the selected transmission channels, the total available transmit power is allocated amongst the channels in a define manner (e.g., uniformly). The threshold can be selected to maximize throughput or based on some other criteria, as described below. A common coding and modulation scheme may also be used for all selected transmission channels in each group to simplify the processing.

If power gains are used to determine transmission capacities and one group includes all available transmission channels in the system, then the average power gain, $L_{ave}$, is initially computed for all available transmission channels and can be expressed as:

$$L_{ave} = \frac{\sum_{j=1}^{N_T} \sum_{k=1}^{N_F} |H(j,k)|^2}{N_T N_F}. \quad \text{Eq (3)}$$

A threshold $\alpha$ may be derived (e.g., as described below) and used to compute a power gain threshold, $\alpha L_{ave}$, which can then be used to select transmission channels. The power gain of each transmission channel is then compared against the power gain threshold, and a transmission channel is selected for use if its power gain is greater than or equal to the power gain threshold (i.e., $|H(j,k)|^2 \geq \alpha L_{ave}$).

In an embodiment, the total available transmit power is allocated uniformly amongst the selected transmission channels, and the transmit power for each selected transmission channel can be expressed as:

$$P_{tx}(j,k) = \begin{cases} \frac{P_{tx\_total}}{N_U}, & |H(j,k)|^2 \geq \alpha L_{ave} \\ 0, & \text{otherwise,} \end{cases} \quad \text{Eq (4)}$$

where $N_U$ is the number of transmission channels selected for use from amongst the $N_T \cdot N_F$ available transmission channels. If the total available transmit power is distributed uniformly amongst all $N_T \cdot N_F$ available transmission channels, then the transmit power allocated for each transmission channel would be $$\frac{P_{tx\_total}}{N_T N_F}.$$

However, with selective channel transmission and uniform power allocation, the transmit power allocated to each transmission channel is increased by a factor of $$b = \frac{N_T N_F}{N_U}.$$

In many communication systems, the known quantities at the receiver are the received SNRs for the transmission channels. In such systems, the selective channel transmission technique can be readily modified to operate based on the received SNRs instead of the channel gains.

If the total available transmit power is uniformly allocated to all available transmission channels and the noise variance, $\sigma^2$, is constant for all channels, then the received SNR, $\gamma(j,k)$, for transmission channel (j,k) can be expressed as:

$$\gamma(j,k) = \frac{P_{rx}(j,k)}{\sigma^2} = \frac{P_{tx\_total}}{\sigma^2 N_T N_F} |H(j,k)|^2. \quad \text{Eq (5)}$$

The average received SNR, $\gamma_{ave}$, per available transmission channel may be expressed as:

$$\gamma_{ave} = \frac{P_{tx\_total}}{\sigma^2 (N_T N_F)^2} \sum_{j=1}^{N_T} \sum_{k=1}^{N_F} |H(j,k)|^2. \quad \text{Eq (6)}$$

The total received SNR, $\gamma_{total}$, for all available transmission channels may be expressed as:

$$\gamma_{total} = \frac{P_{tx\_total}}{\sigma^2} L_{ave} = \frac{P_{tx\_total}}{\sigma^2 N_T N_F} \sum_{j=1}^{N_T} \sum_{k=1}^{N_F} |H(j,k)|^2. \quad \text{Eq (7)}$$

The average and total received SNRs, $\gamma_{ave}$ and $\gamma_{total}$, in equations (6) and (7), respectively, are based on the total transmit power being equally distributed across all available transmission channels.

A threshold $\alpha$ may be derived and used to compute an SNR threshold, $\alpha \gamma_{ave}$, which can be used to select transmission channels. The SNR of each transmission channel may then be compared against the SNR threshold, and a transmission channel may be selected for use if its SNR is greater than or equal to the SNR threshold (i.e., $\gamma(j,k) \geq \alpha \gamma_{ave}$). If $N_U$ transmission channels are selected from amongst the $N_T \cdot N_F$ available transmission channels, then the total available transmit power may be distributed uniformly amongst the $N_U$ selected transmission channels as shown in equation (4).

As noted above, the selective channel transmission may be applied individually and independently to groups of transmission channels. In this case, the available transmission channels in the communication system are initially segregated into a number of groups. Any number of groups may be formed, and each group may include any number of channels (i.e., there need not be equal number of channels in each group).

A particular amount of transmit power is also available for each group based on various system constraints and considerations. For the selective channel transmission technique, all or a subset of the available transmission channels in each group are selected for use, e.g., based on a particular threshold determined for the group. The total available transmit power for each group is then allocated in a particular defined manner to the selected transmission channels in the group.

Various additional flexibilities may be afforded by processing data separately for each group of transmission channels. For example, the selective channel transmission may be independently applied to each group of channels. Also, for those groups for which selective channel transmission is applied, one threshold may be used for all groups, each group may be assigned a separate threshold, or some groups may share the same threshold while other groups may be assigned separate thresholds. Also, the same or different transmit power allocation schemes may be used for those groups for which selective channel transmission is applied. A different coding and modulation scheme may also be used for each group, which may be selected based on the transmission capacities (e.g., the achieved SNRs) of the selected transmission channels in the group.

For a MIMO system that utilizes OFDM, the MIMO construct creates multiple ($N_S$) transmission channels in the spatial domain and the OFDM construct creates multiple ($N_F$) transmission channels in the frequency domain. The total number of transmission channels available to send data is then $N=N_S \cdot N_F$. The N transmission channels may then be segregated into a number of groups in various ways.

In one embodiment, the transmission channels are segregated on a per transmit antenna basis. If the number of spatial subchannels is equal to the number of transmit antennas (i.e., $N_T=N_S$), then the selective channel transmission may be applied independently to each of the $N_T$ transmit antennas. In an embodiment, the $N_T$ groups corresponding to the $N_T$ transmit antennas may be associated with $N_T$ respective thresholds, one threshold for each group or transmit antenna. The selective channel transmission then determines the subset of transmission channels (or frequency subchannels) associated with each transmit antenna having adequate transmission capacities (e.g., received SNRs). This can be achieved, for example, by comparing the received SNR for each frequency subchannel to the threshold for the transmit antenna. The total transmit power available for each transmit antenna is then allocated in a defined manner (e.g., uniformly) to the selected frequency subchannels for the transmit antenna.

In another embodiment, the available transmission channels are segregated on a per frequency subchannel basis. In this embodiment, the selective channel transmission may be applied independently to each of the $N_F$ frequency subchannels. The spatial subchannels in each group may then be selected for use for data transmission based on the threshold for the group.

The segregation of the available transmission channels into groups permits optimization to be achieved on a per group basis (e.g., per transmit antenna or per frequency subchannel). A specific coding and modulation scheme may also be used for all selected transmission channels in each group, which can simplify the processing at both the transmitter and receiver systems. In an example application, one or more transmit antennas may be assigned to each terminal scheduled for data transmission. The transmission channels associated with the assigned transmit antennas for each terminal may be placed in a group, the selective channel transmission may be performed on each group of transmission channels, and a single coding and modulation scheme may be used for the data transmission to each terminal.

If the total available transmit power for group j is uniformly distributed across all available transmission channels in the group and the noise variance, $\sigma^2$, is constant for all channels, then the received SNR, $\gamma_j(k)$, for transmission channel k in group j can be expressed as:

$$\gamma_j(k) = \frac{P_{rx,j}(k)}{\sigma^2} = \frac{P_{tx\_total,j}}{\sigma^2 N_j} |H_j(k)|^2. \qquad \text{Eq (8)}$$

where
- $P_{rx,j}(k)$ is the received power for transmission channel k in group j,
- $P_{tx\_total,j}$ is the total available transmit power for group j,
- $H_j(k)$ is effective channel gain from the transmitter to the receiver for transmission channel k in group j, and
- $N_j$ is the number of transmission channels in group j. Group j may correspond to a specific transmit antenna j, in which case $N_j=N_F$.

The average received SNR, $\gamma_{ave,j}$, per available transmission channel in group j may be expressed as:

$$\gamma_{ave,j} = \frac{P_{tx\_total,j}}{\sigma^2 N_j^2} \sum_{k=1}^{N_j} |H_j(k)|^2. \qquad \text{Eq (9)}$$

The total received SNR, $\gamma_{total,j}$, for all available transmission channels in group j may be expressed as:

$$\gamma_{total,j} = \frac{P_{tx\_total,j}}{\sigma^2} L_{ave,j} = \frac{P_{tx\_total,j}}{\sigma^2 N_j} \sum_{k=1}^{N_j} |H_j(k)|^2, \qquad \text{Eq (10)}$$

where the average power gain, $L_{ave,j}$, for group j may be expressed as:

$$L_{ave,j} = \frac{1}{N_j} \sum_{k=1}^{N_j} |H_j(k)|^2. \qquad \text{Eq (11)}$$

The average and total received SNRs, $\gamma_{ave,j}$ and $\gamma_{total,j}$, for group j is based on the total transmit power, $P_{tx\_total,j}$, for group j being uniformly distributed across all available transmission channels in the group.

A threshold $\alpha_j$ may be derived for group j and used to compute an SNR threshold, $\alpha_j \gamma_{ave,j}$, which can then be used to select transmission channels. The SNR of each transmission channel in the group may be compared against the SNR threshold, and a transmission channel may be selected for use if its SNR is greater than or equal to the SNR threshold (i.e., $\gamma_j(k) \geq \alpha_j \gamma_{ave,j}$). If $N_{Uj}$ transmission channels are selected from amongst the $N_j$ available transmission channels in the group, then the total available transmit power for the group may be distributed uniformly amongst the $N_{Uj}$ selected transmission channels. The transmit power for each selected transmission channel in group j may then be expressed as:

$$P_{tx,j}(k) = \begin{cases} \dfrac{P_{tx\_total,j}}{N_{Uj}}, & \gamma_j(k) \geq \alpha_j \gamma_{ave,j} \\ 0, & \text{otherwise.} \end{cases} \qquad \text{Eq (12)}$$

As shown in equation (25), only transmission channels for which the received SNR is greater than or equal to the SNR threshold (i.e., $\gamma_j(k) \geq \alpha_j \gamma_{ave,j}$) are selected for use.

The process described above may be repeated for each group of transmission channels. Each group may be associated with a different threshold, $\alpha_j \gamma_{ave,j}$, derived to provide the desire performance for that group. The ability to allocate transmit power on a per group (e.g., per transmit antenna) basis can provide enhanced flexibility and may further improve performance.

Figure 2A:
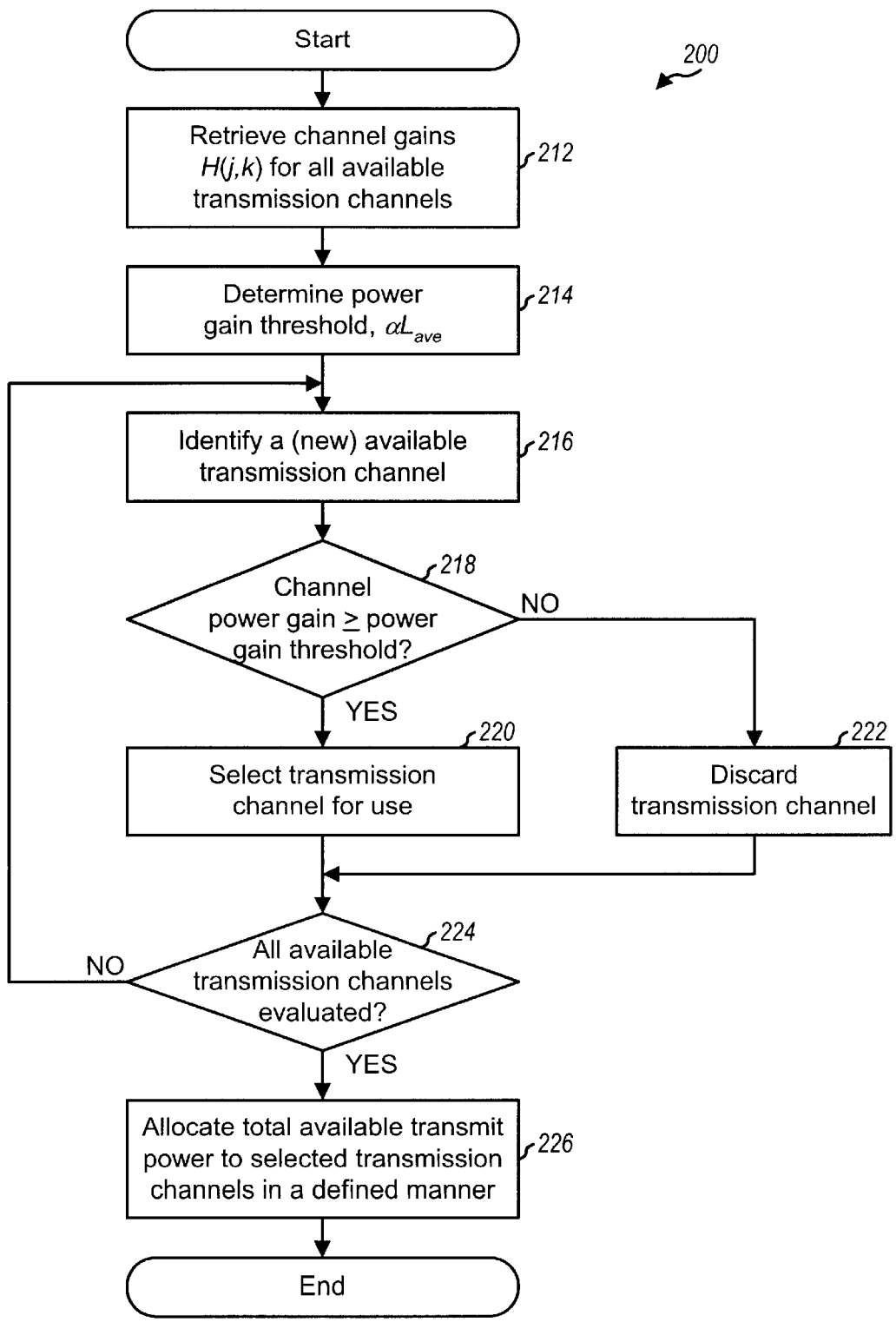
FIG. 2A is a flow diagram of a process to select transmission channels and to allocate transmit power using selective channel transmission, in accordance with an embodiment of the invention.

FIG. 2A is a flow diagram of a process 200 to select transmission channels and to allocate transmit power using selective channel transmission, in accordance with an embodiment of the invention. Process 200 assumes that all available transmission channels are considered (i.e., one group of transmission channels for the communication system). Process 200 may be used if the channel gains H(j,k), the received SNRs γ(j,k), or some other characteristics are available for the transmission channels. For clarity, process 200 is described below for the case in which the channel gains are available, and the case in which the received SNRs are available is shown within brackets.

Initially, the channel gains H(j,k) [or the received SNRs γ(j,k)] of all available transmission channels are retrieved, at step 212. A power gain threshold, $\alpha L_{ave}$, [or an SNR threshold, $\alpha \gamma_{ave}$] used to select transmission channels for data transmission is also determined, at step 214. The threshold may be computed as described in further detail below.

Each available transmission channel is then evaluated for possible use. A (not yet evaluated) available transmission channel is identified for evaluation, at step 216. For the identified transmission channel, a determination is made whether or not the power gain [or the received SNR] for the channel is greater than or equal to the power gain threshold (i.e., $|H(j,k)|^2 \geq \alpha L_{ave}$) [or the SNR threshold (i.e., $\gamma(j,k) \geq \alpha \gamma_{ave}$)], at step 218. If the identified transmission channel satisfies the criterion, then it is selected for use, at step 220. Otherwise, if the transmission channel does not satisfy the criterion, then it is discarded and not used for data transmission, at step 222.

A determination is then made whether or not all available transmission channels have been evaluated, at step 224. If not, the process returns to step 216 and another available transmission channel is identified for evaluation. Otherwise, the process proceeds to step 226.

At step 226, the total available transmit power is allocated in a defined manner to the selected transmission channels. In an embodiment, the total available transmit power is allocated uniformly amongst the selected channels, as shown in equation (4). In other embodiments, the total available transmit power may be allocated in a non-uniform manner using various other allocation schemes. The process then terminates.

Threshold Selection

The threshold used to select transmission channels for data transmission may be set based on various criteria. In one embodiment, the threshold is set to optimize throughput. Several schemes to derive the threshold are described below.

In a first threshold derivation scheme, the threshold is set based on the channel gains and the theoretical transmission capacity of the selected transmission channels. Initially, the channel gains for all available transmission channels are used to compute power gains, which are then ranked and placed in a list G(l) in order of decreasing power gains, where $1 \leq l \leq N_T N_F$, such that $G(1) = \max\{|H(j,k)|^2\}, \ldots,$ and $G(N_T N_F) = \min\{|H(j,k)|^2\}$.

For each l, where $1 \leq l \leq N_T N_F$, the theoretical throughput supported by the l best transmission channels is then computed. This can be achieved as follows. First, the total available transmit power is (e.g., uniformly) allocated to the l best transmission channels, and the transmit power for each of the l transmission channels is then $$\frac{P_{tx\_total}}{l}.$$

Next, the received SNR achievable for each of the l transmission channels is computed based on the transmit power $$\frac{P_{tx\_total}}{l}$$

allocated to each transmission channel and the channel's power gain. The received SNR, $\gamma_l(k)$, for each of the l transmission channels can be computed as:

$$\gamma_l(k) = \frac{P_{tx\_total}}{\sigma^2 l} G(k), \quad 1 \leq k \leq l. \qquad \text{Eq (13)}$$

The theoretical throughput, T(l), for the l best transmission channels can then be computed as:

$$T(l) = \lambda \cdot \sum_{k=1}^{l} \log_2(1 + \gamma_l(k)). \qquad \text{Eq (14)}$$

where λ is real scale factor to account for the inefficiencies in the modulation and coding scheme employed.

The theoretical throughput, T(l), is computed for each value of each l, where $1 \leq l \leq N_T N_F$, and stored to an array. After all $N_T N_F$ values of T(l) have been computed for the $N_T N_F$ possible sets of selected transmission channels, then the array of theoretical throughput values is traversed and the largest value of T(l) is determined. The value of l, $l_{max}$, corresponding to the highest theoretical throughput, $T_{max}(l)$, is then the number of transmission channels that results in the maximum theoretical throughput for these channel conditions and uniform transmit power allocation.

Since the power gains for the available transmission channels are ranked in decreasing order in the list G(l), the theoretical throughput T(l) typically increases as more transmission channels are selected for use until the optimal point is reached, after which the throughput T(l) decreases because more of the total available transmit power is allocated to poorer transmission channels. Thus, instead of computing the theoretical throughput T(l) for all possible values of l, the throughput for each new value of l, T(l), may be compared against the throughput for the previous value of l, T(l−1). The computation may then be terminated if the peak throughput value, $T_{max}(l)$, is reached when T(l)<T(l−1).

The threshold α may then be expressed as:

$$\alpha = \frac{G(l_{max})}{L_{ave}}. \qquad \text{Eq (15)}$$

The threshold α optimizes the theoretical throughput for the given channel conditions.

In the above description, the overall throughput for a set of selected transmission channels is derived based on the theoretical throughput achieved by each of the transmission channels. This method to derive the overall throughput may not provide an accurate result in certain scenario (e.g., if a data stream is transmitted on all selected transmission channels and one or more of the transmission channels are excessively poor and would corrupt the entire data transmission).

In another method for deriving an overall throughput for a set of selected transmission channels, the entire ensemble of SNRs for a set of selected transmission channels is used to derive the overall throughput and/or the coding and modulation scheme. The mapping between the ensemble of SNRs to the overall throughput and/or the coding and modulation scheme may be achieved based on statistical measurements, computer simulations, and so on, and may further be implemented, for example, with one or more tables. If a common coding and modulation scheme is used for all selected transmission channels, then the overall throughput is related to the particular coding and modulation scheme selected for use and the number of selected transmission channels.

For example, the probability distribution of the entire ensemble of SNRs may be determined as a first step. Given this SNR probability distribution, the probability that the SNR falls below a given SNR threshold may be found by examination of the SNR probability distribution. This can be denoted as an "erasure" probability for the given SNR threshold. For each modulation and coding scheme employed, a function that describes the erasure probability as a function of the SNR threshold may be developed via computer simulation or observation over a large number of trials (i.e., a performance database). Given the SNR probability distribution and the performance database, the receiver system can select an appropriate modulation and coding scheme to be used.

In a second threshold derivation scheme, the threshold is set based on the average SNR achievable for the selected transmission channels. This scheme assumes that the data can be processed (e.g., coded and interleaved) such that it can be transmitted via all selected transmission channels and received reliably, even though these channels may individually achieve different SNRs.

Initially, a vector of setpoints (i.e., $Z=[z_1, z_2, \ldots, z_{N_Z}]$) and a corresponding vector of code rates (i.e., $R=[r_1, r_2, \ldots, r_{N_Z}]$) are defined. The code rates include the effects of the coding and modulation scheme and are representative of the information bit rate (i.e., the number of information bits per modulation symbol). Each vector includes $N_Z$ elements corresponding to the number of available code rates, which may be those available for use in the system. Alternatively, the $N_Z$ setpoints may be defined based on the operating points supported by the system. Each setpoint corresponds to a particular received SNR needed to achieve a particular level of performance. The setpoint is typically dependent on the information bit rate, which is further dependent on the specific code rate and modulation scheme used for a data transmission. To simplify the processing at the transmitter and receiver, a common modulation scheme may be used for all selected transmission channels. In this case, the information bit rate and the setpoint are both directly related to the code rate.

Each code rate $r_n$, where $1 \leq n \leq N_Z$, is associated with a respective setpoint $z_n$, which is the minimum received SNR required to operate at that code rate for the required level of performance. The required setpoint $z_n$ for code rate $r_n$ may be determined based on computer simulation, mathematical derivation, and/or empirical measurement, as is known in the art. The elements in the two vectors R and Z may also be ordered such that $\{z_1 > z_2 > \ldots > z_{N_Z}\}$ and $\{r_1 > r_2 > \ldots > r_{N_Z}\}$, with $z_1$ being the largest setpoint and $r_1$ being the highest supported code rate.

The channel gains for all available transmission channels are used to compute power gains, which are then ranked and placed in the list G(l) as described above. A sequence Γ(l) of average achievable SNRs for $N_T N_F$ possible sets of selected transmission channels is then computed. For each value of l, where $1 \leq l \leq N_T N_F$, the total available transmit power is allocated uniformly amongst the l best transmission channels, and the average SNR for the l transmission channels, $\gamma_{avg}(l)$, can be computed as:

$$\gamma_{avg}(l) = \frac{P_{tx\_total}}{\sigma^2 l^2} \sum_{k=1}^{l} G(k), \qquad \text{Eq (16)}$$

where $\sigma^2$ is the received noise power in a single transmission channel. This SNR value, $\gamma_{avg}(l)$, represents the average SNR of the l best transmission channels if the total available transmit power is uniformly allocated to all l channels. The average SNR, $\gamma_{avg}(l)$, is then stored as the l-th element of the sequence Γ(l). The sequence Γ(l) includes decreasingly lower values of $\gamma_{avg}(l)$ for larger values of l since the total available transmit power is allocated to more transmission channels and the transmission channels are progressively worse.

For each code rate $r_n$ (where $1 \leq n \leq N_Z$), the largest value of l, $l_{n,max}$, is then determined such that the average SNR for the l best transmission channels is greater than or equal to the setpoint $z_n$ associated with the code rate $r_n$. This can be achieved by traversing the sequence Γ(l) and comparing each element of the sequence (e.g., starting with the first element, or l=1) against the setpoint $z_n$, as follows:

$$\Gamma(l) \geq z_n \qquad \text{Eq (17)}$$

Thus, for each code rate $r_n$, each value of l (for l=1, 2, ..., $l_{n,max}$) is evaluated to determine whether the average SNR for the l best transmission channels can achieve the associated setpoint $z_n$, if the total transmit power is uniformly distributed across all l channels. The largest value of l, $l_{n,max}$, that satisfies this condition is the greatest number of transmission channels that may be selected for code rate $r_n$ while achieving the required setpoint $z_n$.

The threshold $\alpha_n$ associated with code rate $r_n$ may then be expressed as:

$$\alpha_n = \frac{G(l_{n,max})}{L_{ave}}. \qquad \text{Eq (18)}$$

The threshold $\alpha_n$ optimizes the throughput for code rate $r_n$, which requires the setpoint $z_n$. If a common code rate is used for all selected transmission channels, the maximum achievable throughput $T_n$ for code rate $r_n$ can be computed as the throughput for each channel (which is $r_n$) times the number of selected channels, $l_{n,max}$. The maximum achievable throughput $T_n$ for code rate $r_n$ can thus be expressed as:

$$T_n = l_{n,max} r_n, \qquad \text{Eq (19)}$$

where the unit for $T_n$ is in information bits per modulation symbol.

The optimum throughput for the vector of code rates can then be given by:

$$T_{opt} = \max\{T_n\}. \qquad \text{Eq (20)}$$

As the code rate increases, more information bits may be transmitted per modulation symbol. However, the required SNR also increases, which requires more transmit power for the selected transmission channels for a given noise variance $\sigma^2$. Since the total transmit power is limited, the higher required SNR may be achieved by distributing the total available transmit power over fewer transmission channels. Thus, the maximum achievable throughput for each code rate in the vector R may be computed, and the specific code rate that provides the highest throughput may be deemed as the optimum code rate for the specific channel conditions being evaluated. The optimum threshold $\alpha_{opt}$ is then equal to the threshold $\alpha_n$ corresponding to the specific code rate $r_n$ that results in the optimum throughput $T_{opt}$.

In the threshold derivation schemes described above, the optimum threshold $\alpha_{opt}$ is determined based on the channel gains for all available transmission channels. If the received SNRs are available instead of the channel gains, then the received SNRs may be ranked and placed in a list $\gamma(l)$ in order of decreasing SNRs, where $1 \leq l \leq N_T N_F$, such that the first element in the list $\gamma(1)=\max\{\gamma(j,k)\}, \ldots,$ and the last element in the list $\gamma(N_T N_R)=\min\{\gamma(j,k)\}$. A sequence $\Gamma(l)$ of average achievable SNRs for $N_T N_F$ possible sets of selected transmission channels may then be determined. The average SNR for the l best transmission channels, $\gamma_{avg}(l)$, can be computed as:

$$\gamma_{avg}(l) = \frac{\sum_{k=1}^{l} \gamma(k)}{l}. \qquad \text{Eq (21)}$$

The average SNR, $\gamma_{avg}(l)$ is then stored as the l-th element of the sequence $\Gamma(l)$.

For each code rate $r_n$ (where $1 \leq n \leq N_Z$), the largest value of l, $l_{n,max}$, is then determined such that the average SNR for the l selected transmission channels is greater than or equal to the associated setpoint $z_n$. This condition may be expressed as shown in equation (17) above. Once the largest value of l, $l_{n,max}$, is determined for code rate $r_n$, the threshold $\alpha_n$ associated with this code rate may be determined as:

$$\alpha_n = \frac{\Gamma(l_{n,\max})}{\gamma_{ave}}. \qquad \text{Eq (22)}$$

where $\gamma_{ave}$ is the average SNR over all available transmission channels (i.e., $\gamma_{ave}=\Gamma(N_T N_F)$). The optimum threshold $\alpha_{opt}$ and the optimum throughput $T_{opt}$ may also be determined as described above.

For the above description, the threshold is selected to optimize throughput for the available transmission channels and based on uniform distribution of the total available transmit power over the selected transmission channels. The threshold may also be selected to optimize other performance criteria or metrics, and this is within the scope of the invention. Moreover, other transmit power distribution schemes may also be used and are within the scope of the invention.

Figure 2B:
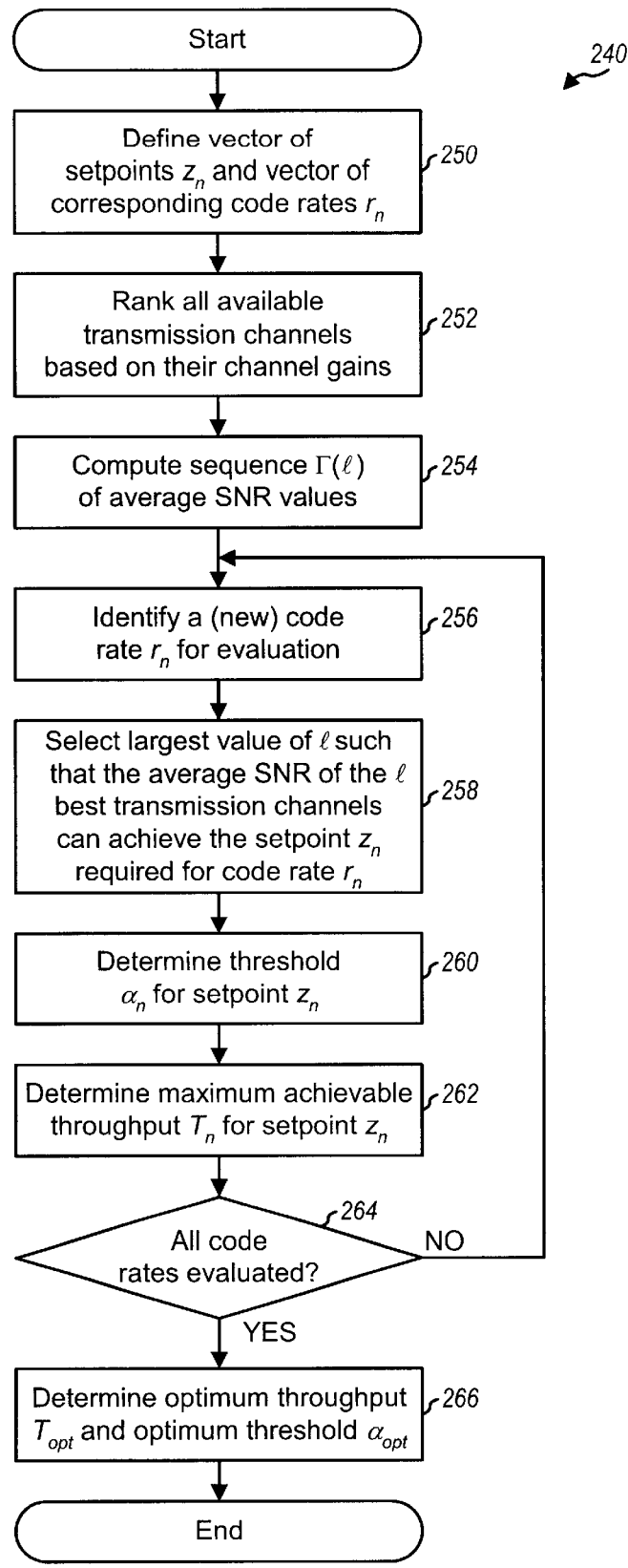
FIG. 2B is a flow diagram of a process to derive a threshold $\alpha$ used to select transmission channels for data transmission, in accordance with an embodiment of the invention.

FIG. 2B is a flow diagram of a process 240 to derive a threshold $\alpha$ used to select transmission channels for data transmission and which implements the second threshold derivation scheme described above. Process 240 may be used if the channel gains, received SNRs, or some other characteristics are available for the transmission channels. For clarity, process 240 is described below for the case in which the channel gains are available, and the case in which the received SNRs are available is shown within brackets.

Initially, a vector of setpoints ($Z=[z_1, z_2, \ldots, z_{N_Z}]$) is defined and a corresponding vector of code rates ($R=[r_1, r_2, \ldots, r_{N_Z}]$) that supports the associated setpoints is determined, at step 250. The channel gains H(j,k) [or the received SNRs $\gamma(j,k)$] for all available transmission channels are retrieved and ranked from the best to the worst, at step 252. A sequence $\Gamma(l)$ of average achievable SNRs for $N_T N_F$ possible sets of selected transmission channels is then computed based on the channel gains as shown in equation (16) [or based on the received SNRs as shown in equation (21)], at step 254.

Each available code rate is then evaluated via a loop. In the first step of the loop, a (not yet evaluated) code rate $r_n$ is identified for evaluation, at step 256. For the first pass through the loop, the identified code rate can be the first code rate $r_1$ in the vector R. For the identified code rate $r_n$, the largest value of l, $l_{n,max}$, is determined such that the average SNR for the l best transmission channels is greater than or equal to the setpoint $z_n$ associated with the code rate $r_n$ being evaluated, at step 258. This can be performed by comparing each element of the sequence $\Gamma(l)$ with the setpoint $z_n$ as shown in equation (17). The threshold $\alpha_n$ associated with code rate $r_n$ is then determined based on the average SNR for $l_{n,max}$ transmission channels, as shown in equation (18), at step 260. The maximum achievable throughput, $T_n$, for code rate $r_n$ can also be determined as shown in equation (19), at step 262.

A determination is then made whether or not all $N_Z$ code rates have been evaluated, at step 264. If not, the process returns to step 256 and another code rate is identified for evaluation. Otherwise, the optimum throughput, $T_{opt}$, and the optimum threshold, $\alpha_{opt}$, may be determined as shown in equation (20), at step 266. The process then terminates.

In the threshold derivation schemes described above, one threshold is determined for all available transmission channels in the communication system since the selective channel transmission is implemented on all channels. In embodiments whereby the transmission channels are segregated into a number of groups, one threshold may be derived and used for each group. The threshold for each group may be derived based on various criteria, such as to optimize the throughput for the transmission channels included in the group.

To determine the threshold for each group, the derivations described above may be used. However, the list $G_j(l)$ for each group includes only the power gains [or received SNRs] for the transmission channels included in the group. Also, a sequence $\Gamma_j(l)$ of average SNRs is defined based on the channel gains [or received SNRs] of the transmission channels in the group.

For the second threshold derivation scheme, the threshold $\alpha_{j,n}$ associated with code rate $r_n$ for group j may be expressed as:

$$\alpha_{j,n} = \frac{G_j(l_{n,\max})}{L_{ave,j}} \text{ or } \alpha_{j,n} = \frac{\Gamma_j(l_{n,\max})}{\gamma_{ave,j}}. \qquad \text{Eq (23)}$$

The optimum threshold $\alpha_{opt,j}$ for group j is equal to the threshold $\alpha_{j,n}$ corresponding to the specific code rate $r_n$ that results in the optimal throughput $T_{opt,j}$ for group j.

As noted above each group of transmission channels may be associated with a respective threshold. Alternatively, a number of groups may share the same threshold. This may be desirable, for example, if the same coding and modulation scheme is to be used for a number of transmit antennas and the available transmit power may be also between these transmit antennas.

In the schemes described above, the threshold $\alpha$ is derived based on the highest throughput achieved with uniform distribution of the total available transmit power amongst the selected transmission channels. In some other schemes, the threshold may be derived based on some other conditions and/or metrics.

In certain schemes, the threshold may be derived based on non-uniform distribution of the total available transmit power amongst the selected transmission channels. For example, a power allocation scheme may also be devised whereby more transmit power is allocated to better transmission channels, which may improve throughput. As another example, a power allocation scheme may be devised whereby more transmit power is allocated to poorer transmission channels (to a limit), which may improve performance if the poor channels limit performance.

Various schemes may be devised whereby the total available transmit power may be allocated non-uniformly, for example, based on the distribution of SNRs achieved for the transmission channels and the available coding and modulation schemes (i.e., the available code rates and modulation schemes). As a specific example, the available transmission channels may be ranked based on their achieved SNRs and partitioned into a number of sets. The transmission channels in the worse set may be omitted from use, a first percentage (i.e., x %) of the total available transmit power may be allocated to the transmission channels in the second set, a second percentage (i.e., y %) of the total available transmit power may be allocated to the transmission channels in the third set, and so on. In some schemes, the threshold may be selected to maximize the throughput achieved based on unequal transmit power allocation.

In another specific scheme, the threshold may simply be a particular (fixed) target SNR, and all transmission channels having received SNRs greater than or equal to the target SNR is selected for use, with the received SNR being based on uniform transmit power allocation amongst the best transmission channels.

Various other transmit power allocation schemes may also be implemented and are within the scope of the invention.

Multi-Channel Communication System

Figure 3:
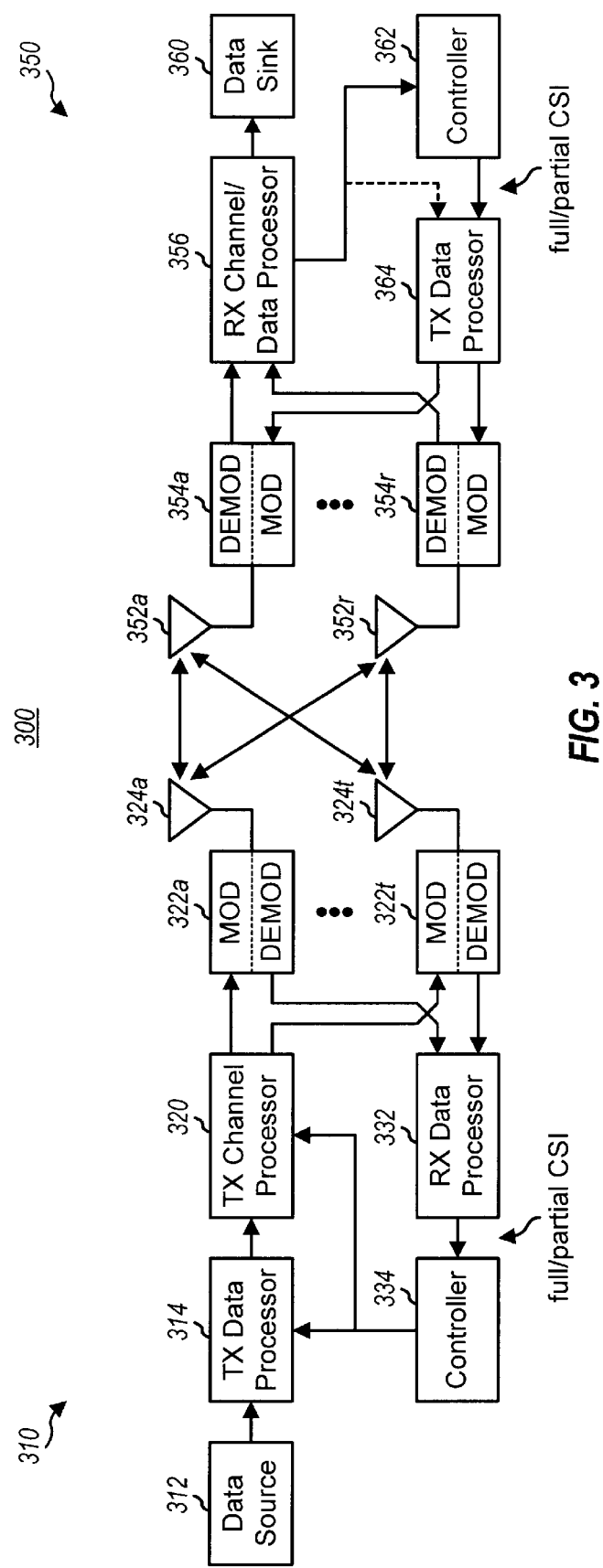
FIG. 3 is a diagram of a MIMO communication system capable of implementing various aspects and embodiments of the invention.

FIG. 3 is a diagram of a MIMO communication system 300 capable of implementing various aspects and embodiments of the invention. System 300 includes a first system 310 (e.g., base station 104 in FIG. 1) in communication with a second system 350 (e.g., terminal 106). System 300 may be operated to employ a combination of antenna, frequency, and temporal diversity to increase spectral efficiency, improve performance, and enhance flexibility.

At system 310, a data source 312 provides data (i.e., information bits) to a transmit (TX) data processor 314, which (1) encodes the data in accordance with a particular coding scheme, (2) interleaves (i.e., reorders) the encoded data based on a particular interleaving scheme, and (3) maps the interleaved bits into modulation symbols for one or more transmission channels selected for use for data transmission. The encoding increases the reliability of the data transmission. The interleaving provides time diversity for the coded bits, permits the data to be transmitted based on an average SNR for the selected transmission channels, combats fading, and further removes correlation between coded bits used to form each modulation symbol. The interleaving may further provide frequency diversity if the coded bits are transmitted over multiple frequency subchannels. In an aspect, the coding, interleaving, and/or symbol mapping may be performed based on control signals provided by a controller 334.

A TX channel processor 320 receives and demultiplexes the modulation symbols from TX data processor 314 and provides a stream of modulation symbols for each selected transmission channel, one modulation symbol per time slot. TX channel processor 320 may further precondition the modulation symbols for the selected transmission channels if full CSI is available.

If OFDM is not employed, TX channel processor 320 provides a stream of modulation symbols for each antenna used for data transmission. And if OFDM is employed, TX channel processor 320 provides a stream of modulation symbol vectors for each antenna used for data transmission. And if full-CSI processing is performed, TX channel processor 320 provides a stream of preconditioned modulation symbols or a stream of preconditioned modulation symbol vectors for each antenna used for data transmission, depending on whether or not OFDM is employed. Each stream is then received and modulated by a respective modulator (MOD) 322 and transmitted via an associated antenna 324.

At receiver system 350, a number of receive antennas 352 receive the transmitted signals and provide the received signals to respective demodulators (DEMOD) 354. Each demodulator 354 performs processing complementary to that performed at modulator 322. The modulation symbols from all demodulators 354 are then provided to a receive (RX) channel/data processor 356 and further processed to recover the transmitted data streams. RX channel/data processor 356 performs processing complementary to that performed by TX data processor 314 and TX channel processor 320 and provides decoded data to a data sink 360. The processing by receiver system 350 is described in further detail below.

MIMO Transmitter Systems

Figure 4A:
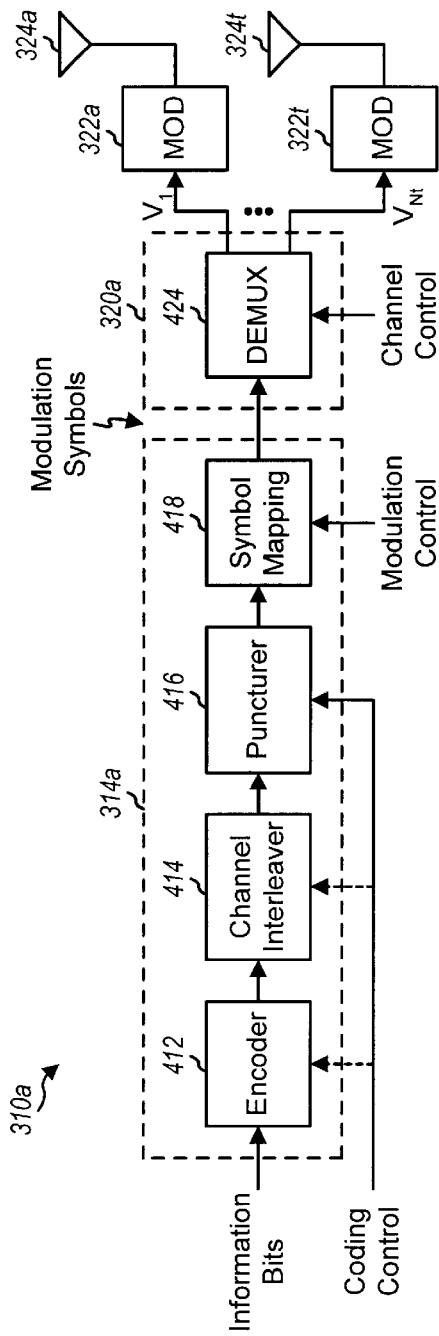
FIGS. 4A through 4D are block diagrams of four MIMO transmitter systems capable of processing data in accordance with four specific embodiments of the invention.

FIG. 4A is a block diagram of a MIMO transmitter system 310a, which is capable of processing data in accordance with an embodiment of the invention. Transmitter system 310a is one embodiment of the transmitter portion of system 310 in FIG. 3, and includes (1) a TX data processor 314a that receives and processes information bits to provide modulation symbols and (2) a TX channel processor 320a that demultiplexes the modulation symbols for the selected transmission channels.

In the embodiment shown in FIG. 4A, TX data processor 314a includes an encoder 412, a channel interleaver 414, a puncturer 416, and a symbol mapping element 418. Encoder 412 receives the aggregate information bits to be transmitted and encodes the received bits in accordance with a particular coding scheme to provide coded bits. Channel interleaver 414 interleaves the coded bits based on a particular interleaving scheme to provide diversity. In an embodiment, the interleaving is performed such that the transmitted bits may be recovered based on the average SNR of the transmission channels selected for use. Puncturer 416 punctures (i.e., deletes) zero or more of the interleaved coded bits to provide the desired number of coded bits. And symbol mapping element 418 maps the unpunctured bits into modulation symbols for the selected transmission channels.

Pilot data (e.g., data of known pattern such as a sequence of all zeros or all ones) may also be multiplexed with the processed information bits. The pilot data may be transmitted (e.g., in a time division multiplexed (TDM) manner) in a subset or all of the selected transmission channels, or in a subset or all of the available transmission channels. The pilot data may also be transmitted in a code division multiplexed (CDM) manner along with the coded data in all or a subset of the transmission channels. The pilot data may be used at the receiver to perform channel estimation and demodulation, as described below.

As shown in FIG. 4A, the data encoding, interleaving, and puncturing may be achieved based on one or more coding control signals, which identify the specific coding, interleaving, and puncturing schemes to be used. The symbol mapping may be achieved based on a modulation control signal that identifies the specific modulation scheme to be used.

In one coding and modulation scheme, the coding is achieved by using a fixed base code and adjusting the puncturing to achieve the desired code rate, e.g., as supported by the average SNR of the selected transmission channels. The base code may be a Turbo code, a convolutional code, a concatenated code, or some other code. The base code may also be of a particular rate (e.g., a rate 1/3 code). For this scheme, the puncturing may be performed after the channel interleaving to achieve the desired code rate.

Symbol mapping element 416 can be designed to group sets of unpunctured bits to form non-binary symbols, and to map each non-binary symbol into a point in a signal constellation corresponding to the modulation scheme selected for use for the selected transmission channels. The modulation scheme may be QPSK, M-PSK, M-QAM, or some other scheme. Each mapped signal point corresponds to a modulation symbol.

The encoding, interleaving, puncturing, and symbol mapping at transmitter system 310a can be performed based on numerous schemes. One specific scheme is described in the aforementioned U.S. patent application Ser. No. 09/776,073.

The number of information bits that may be transmitted for each modulation symbol for a particular level of performance (e.g., 1% PER) is dependent on the received SNR. Thus, the coding and modulation scheme for the selected transmission channels may be determined based on the characteristics of the channels (e.g., the channel gains, received SNRs, or some other information). The channel interleaving may also be adjusted based on the coding control signal.

Table 1 lists various combinations of coding rate and modulation scheme that may be used for a number of received SNR ranges. The supported bit rate for each transmission channel may be achieved using any one of a number of possible combinations of coding rate and modulation scheme. For example, one information bit per modulation symbol may be achieved by using (1) a coding rate of 1/2 and QPSK modulation, (2) a coding rate of 1/3 and 8-PSK modulation, (3) a coding rate of 1/4 and 16-QAM, or some other combination of coding rate and modulation scheme. In Table 1, QPSK, 16-QAM, and 64-QAM are used for the listed SNR ranges. Other modulation schemes such as 8-PSK, 32-QAM, 128-QAM, and so on, may also be used and are within the scope of the invention.

TABLE 1

| Received SNR Range | # of Information Bits/Symbol | Modulation Symbol | # of Coded Bits/Symbol | Coding Rate |
| --- | --- | --- | --- | --- |
| 1.5–4.4 | 1 | QPSK | 2 | 1/2 |
| 4.4–6.4 | 1.5 | QPSK | 2 | 3/4 |
| 6.4–8.35 | 2 | 16-QAM | 4 | 1/2 |
| 8.35–10.4 | 2.5 | 16-QAM | 4 | 5/8 |
| 10.4–12.3 | 3 | 16-QAM | 4 | 3/4 |
| 12.3–14.15 | 3.5 | 64-QAM | 6 | 7/12 |
| 14.15–15.55 | 4 | 64-QAM | 6 | 2/3 |
| 15.55–17.35 | 4.5 | 64-QAM | 6 | 3/4 |
| >17.35 | 5 | 64-QAM | 6 | 5/6 |

The modulation symbols from TX data processor 314a are provided to TX channel processor 320a, which is one embodiment of TX channel processor 320 in FIG. 3. Within TX channel processor 320a, a demultiplexer 424 receives and demultiplexes the modulation symbols into a number of modulation symbol streams, one stream for each transmission channel selected for use. Each modulation symbol stream is then provided to a respective modulator 322. If OFDM is employed, the modulation symbols at each time slot for all selected frequency subchannels of each transmit antenna are combined into a modulation symbol vector. Each modulator 322 converts the modulation symbols (for a system without OFDM) or the modulation symbol vectors (for a system with OFDM) into an analog signal, and further amplifies, filters, quadrature modulates, and upconverts the signal to generate a modulated signal suitable for transmission over the wireless link.

Figure 4B:
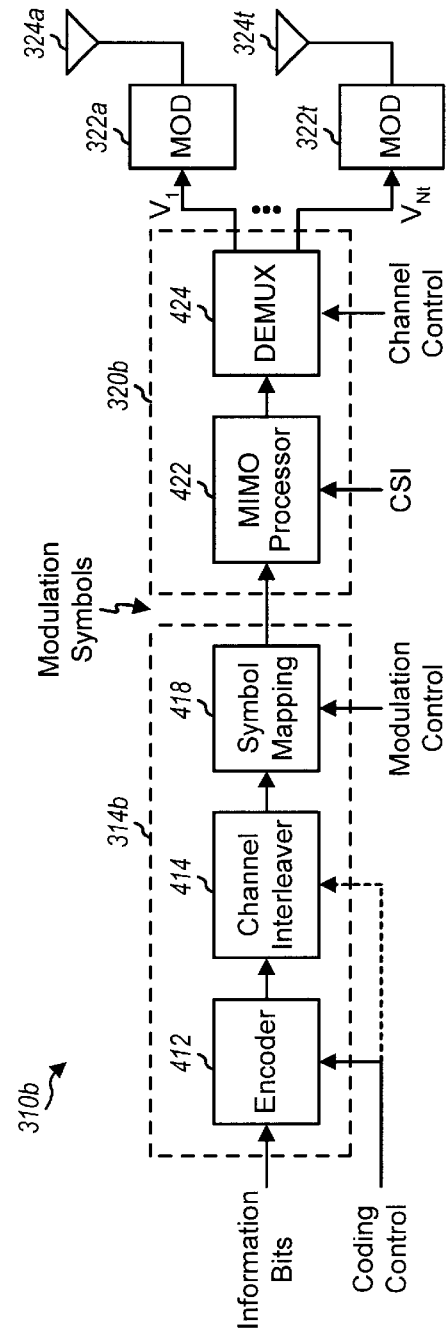

FIG. 4B is a block diagram of a MIMO transmitter system 310b, which is capable of processing data in accordance with another embodiment of the invention. Transmitter system 310b is another embodiment of the transmitter portion of system 310 in FIG. 3 and includes a TX data processor 314b coupled to a TX channel processor 320b.

In the embodiment shown in FIG. 4B, TX data processor 314b includes encoder 412, channel interleaver 414, and symbol mapping element 418. Encoder 412 receives and encodes the aggregate information bits in accordance with a particular coding scheme to provide coded bits. The coding may be achieved based on a particular code and code rate selected by controller 334, as identified by the coding control signals. In this embodiment, puncturing and/or bit repetition (if any) is performed by encoder 412. Channel interleaver 414 interleaves the coded bits, and symbol mapping element 418 maps the interleaved bits into modulation symbols for the selected transmission channels.

In the embodiment shown in FIG. 4B, transmitter system 310b is capable of preconditioning the modulation symbols based on full CSI. Within TX channel processor 320b, a MIMO processor 422 demultiplexes the modulation symbols into a number of (up to $N_C$) modulation symbol streams, one stream for each spatial subchannel (i.e., eigenmode) used to transmit the modulation symbols. For full-CSI processing, MIMO processor 422 then preconditions the (up to $N_C$) modulation symbols at each time slot to generate $N_T$ preconditioned modulation symbols, as follows:

$$\begin{bmatrix} x_1 \\ x_2 \\ \vdots \\ x_{N_T} \end{bmatrix} = \begin{bmatrix} e_{11}, & e_{12}, & \cdots & e_{1N_C} \\ e_{21}, & e_{22}, & & e_{2N_C} \\ \vdots & & \ddots & \vdots \\ e_{N_T1}, & e_{N_T1}, & \cdots & e_{N_TN_C} \end{bmatrix} \cdot \begin{bmatrix} b_1 \\ b_2 \\ \vdots \\ b_{N_C} \end{bmatrix} \quad \text{Eq (24)}$$

where $b_1, b_2, \ldots b_{N_C}$ are respectively the modulation symbols for spatial subchannels $1, 2, \ldots N_C$;

$e_{ij}$ are elements of an eigenvector matrix E related to the transmission characteristics from the transmit antennas to the receive antennas; and $x_1, x_2, \ldots x_{N_T}$ are the preconditioned modulation symbols, which can be expressed as:

$$x_1 = b_1 \cdot e_{11} + b_2 \cdot e_{12} + \ldots + b_{N_C} \cdot e_{1N_C},$$

$$x_2 = b_1 \cdot e_{21} + b_2 \cdot e_{22} + \ldots + b_{N_C} \cdot e_{2N_C}, \text{ and}$$

$$x_{N_T} = b_1 \cdot e_{N_T1} + b_2 \cdot e_{N_T2} + \ldots + b_{N_C} \cdot e_{N_TN_C}.$$

The eigenvector matrix E may be computed by the transmitter or is provided to the transmitter (e.g., by the receiver).

For full-CSI processing, each preconditioned modulation symbol, $x_i$, for a particular transmit antenna i represents a linear combination of the modulation symbols for up to $N_C$ spatial subchannels. For each time slot, the (up to) $N_T$ preconditioned modulation symbols generated by MIMO processor 422 are demultiplexed by demultiplexer 424 and provided to (up to) $N_T$ modulators 322. Each modulator 322 converts the preconditioned modulation symbols (for a system without OFDM) or the preconditioned modulation symbol vectors (for a system with OFDM) into a modulated signal suitable for transmission over the wireless link.

Figure 4C:
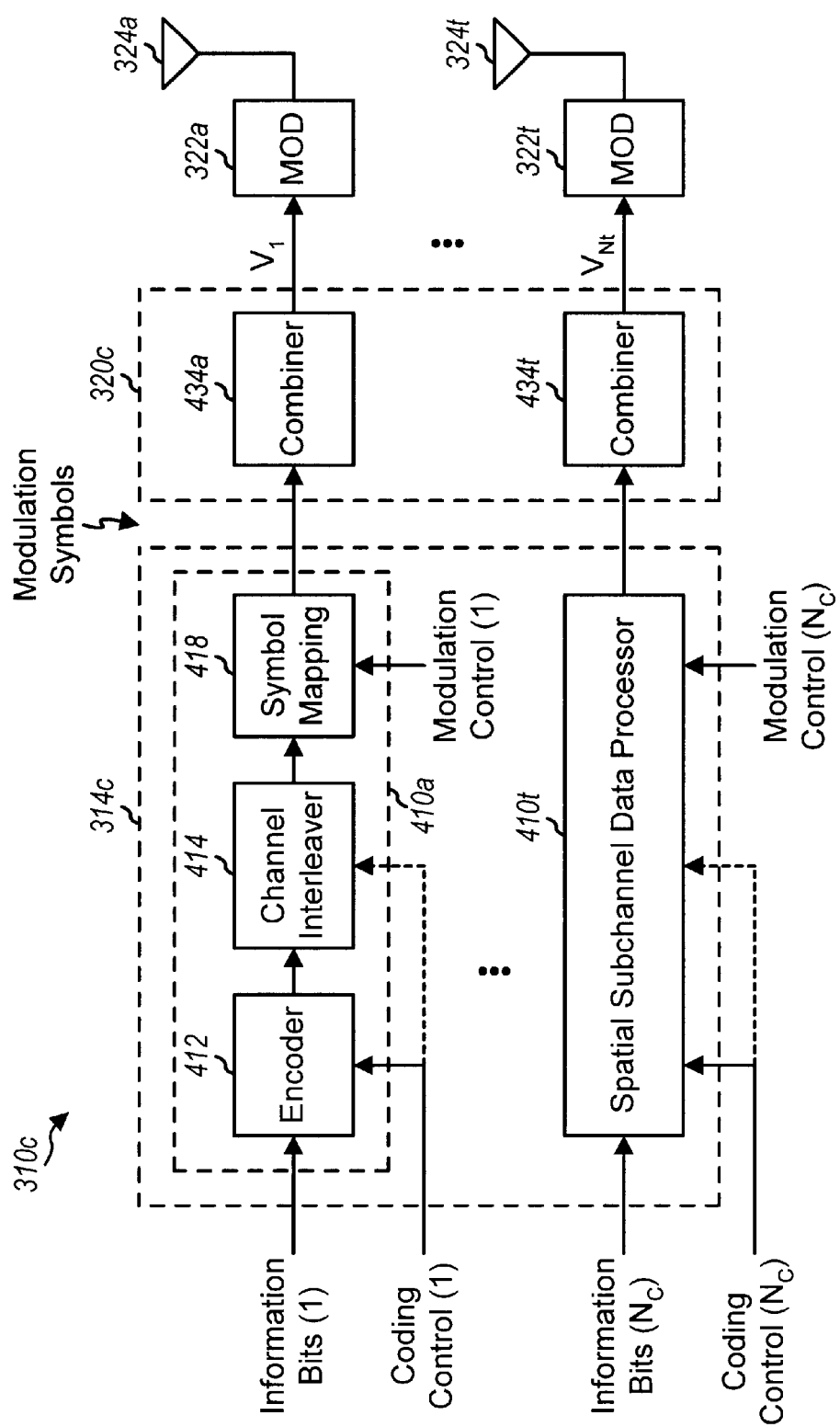

FIG. 4C is a block diagram of a MIMO transmitter system 310c, which utilizes OFDM and is capable of processing data in accordance with yet another embodiment of the invention. Transmitter system 310c is another embodiment of the transmitter portion of system 310 in FIG. 3 and includes a TX data processor 314c coupled to a TX channel processor 320c. TX data processor 314c may be operated to independently code and modulate data for each group of transmission channels based on a particular coding and modulation scheme selected for the group. Each group may correspond to one transmit antenna and the transmission channels in each group may correspond to the frequency subchannels for the transmit antenna.

In the embodiment shown in FIG. 4C, TX data processor 314c includes a number of spatial subchannel data processor 410a through 410t, one data processor 410 for each group of transmission channels to be independently coded and modulated. Each data processor 410 includes encoder 412, channel interleaver 414, and symbol mapping element 418. These elements of data processor 410 operate to encode the information bits for a group being processed by the data processor, interleave the coded bits, and map the interleaved bits to generate modulation symbols. As shown in FIG. 4C, the coding and modulation control may be individually provided for each group.

The modulation symbols from each data processor 410 are provided to a respective combiner 434 within TX channel processor 320c. If each group includes the selected frequency subchannels for a particular transmit antenna, then combiner 434 combines the modulation symbols for the selected frequency subchannels to form a modulation symbol vector for each time slot, which is then provided to a respective modulator 322. The processing by each modulator 322 to generate a modulated signal is described below.

Figure 4D:
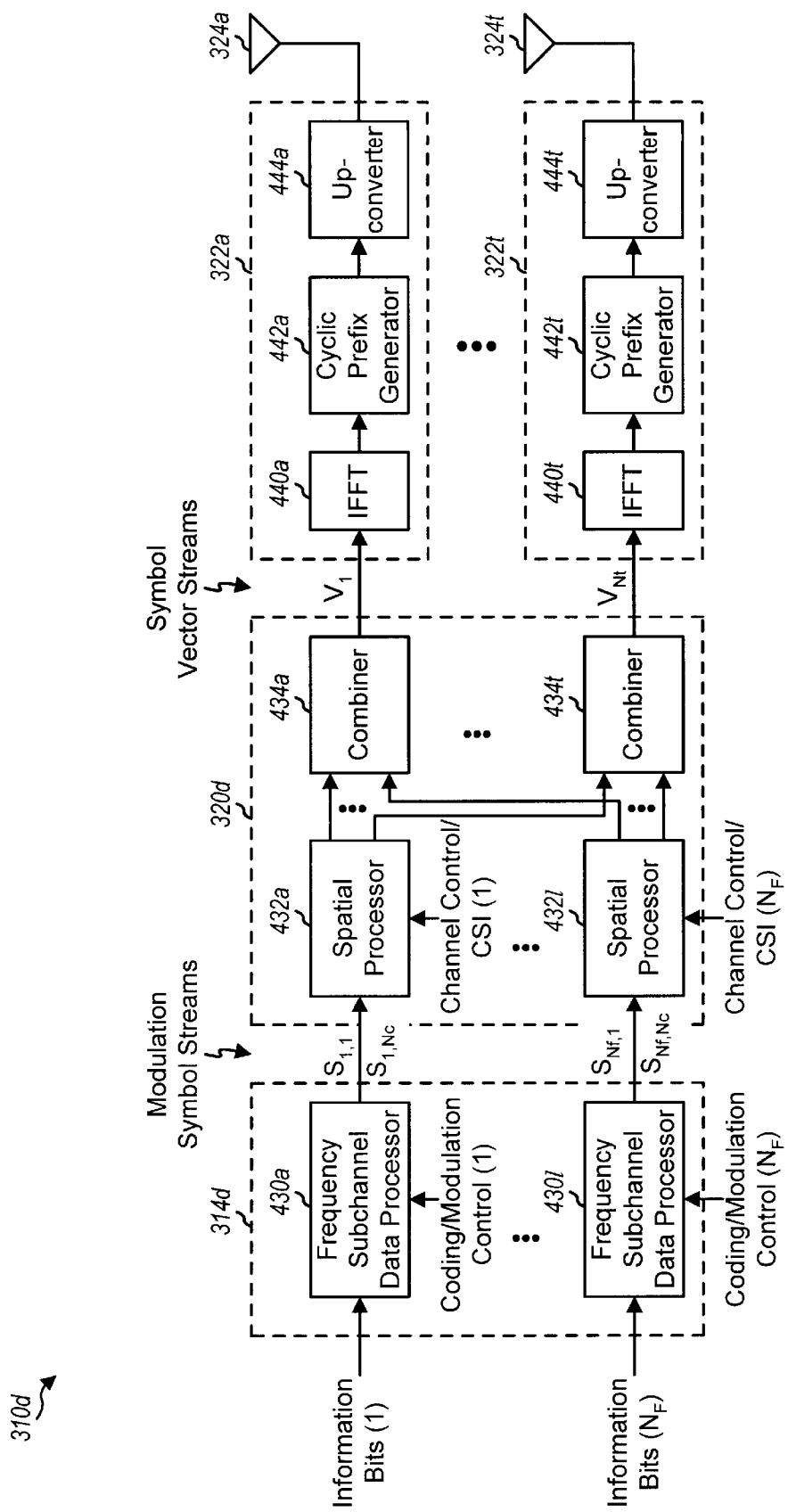

FIG. 4D is a block diagram of a MIMO transmitter system 310d, which also utilizes OFDM and is capable of processing data in accordance with yet another embodiment of the invention. In this embodiment, the transmission channels for each frequency subchannel may be independently processed. Within a TX data processor 314d, the information bits to be transmitted are demultiplexed by a demultiplexer 428 into a number of (up to $N_F$) frequency subchannel data streams, one stream for each of the frequency subchannels to be used for data transmission. Each frequency subchannel data stream is provided to a respective frequency subchannel data processor 430.

Each data processor 430 processes data for a respective frequency subchannel of the OFDM system. Each data processor 430 may be implemented similar to TX data processor 314a shown in FIG. 4A, TX data processor 314b shown in FIG. 4B, or with some other design. In one embodiment, data processor 430 demultiplexes the frequency subchannel data stream into a number of data substreams, one data substream for each spatial subchannel selected for use for the frequency subchannel. Each data substream is then encoded, interleaved, and symbol mapped to generate modulation symbols for the data substream. The coding and modulation for each frequency subchannel data stream or each data substream may be adjusted based on the coding and modulation control signals. Each data processor 430 thus provides up to $N_C$ modulation symbol streams for up to $N_C$ spatial subchannels selected for use for the frequency subchannel.

For a MIMO system utilizing OFDM, the modulation symbols may be transmitted on multiple frequency subchannels and from multiple transmit antennas. Within a MIMO processor 320d, the up to $N_C$ modulation symbol streams from each data processor 430 are provided to a respective spatial processor 432, which processes the received modulation symbols based on the channel control and/or the available CSI. Each spatial processor 432 may simply implement a demultiplexer (such as that shown in FIG. 4A) if full-CSI processing is not performed, or may implement a MIMO processor followed by a demultiplexer (such as that shown in FIG. 4B) if full-CSI processing is performed. For a MIMO system utilizing OFDM, the full-CSI processing (i.e., preconditioning) may be performed for each frequency subchannel.

Each subchannel spatial processor 432 demultiplexes the up to $N_C$ modulation symbols for each time slot into up to $N_T$ modulation symbols for the transmit antennas selected for use for that frequency subchannel. For each transmit antenna, a combiner 434 receives the modulation symbols for up to $N_F$ frequency subchannels selected for use for that transmit antenna, combines the symbols for each time slot into a modulation symbol vector V, and provides the modulation symbol vector to the next processing stage (i.e., a respective modulator 322).

TX channel processor 320d thus receives and processes the modulation symbols to provide up to $N_T$ modulation symbol vectors, $V_1$ through $V_{Nt}$, one modulation symbol vector for each transmit antenna selected for use for data transmission. Each modulation symbol vector V covers a single time slot, and each element of the modulation symbol vector V is associated with a specific frequency subchannel having a unique subcarrier on which the modulation symbol is conveyed.

FIG. 4D also shows an embodiment of modulator 322 for OFDM. The modulation symbol vectors $V_1$ through $V_{Nt}$ from TX channel processor 320d are provided to modulators 322a through 322t, respectively. In the embodiment shown in FIG. 4D, each modulator 322 includes an inverse Fast Fourier Transform (IFFT) 440, a cyclic prefix generator 442, and an upconverter 444.

IFFT 440 converts each received modulation symbol vector into its time-domain representation (which is referred to as an OFDM symbol) using IFFT. IFFT 440 can be designed to perform the IFFT on any number of frequency subchannels (e.g., 8, 16, 32, ..., $N_F$). In an embodiment, for each modulation symbol vector converted to an OFDM symbol, cyclic prefix generator 442 repeats a portion of the time-domain representation of the OFDM symbol to form a "transmission symbol" for a specific transmit antenna. The cyclic prefix insures that the transmission symbol retains its orthogonal properties in the presence of multipath delay spread, thereby improving performance against deleterious path effects. The implementation of IFFT 440 and cyclic prefix generator 442 is known in the art and not described in detail herein.

The time-domain representations from each cyclic prefix generator 442 (i.e., the transmission symbols for each antenna) are then processed (e.g., converted into an analog signal, modulated, amplified, and filtered) by upconverter 444 to generate a modulated signal, which is then transmitted from a respective antenna 324.

OFDM modulation is described in further detail in a paper entitled "Multicarrier Modulation for Data Transmission: An Idea Whose Time Has Come," by John A. C. Bingham, IEEE Communications Magazine, May 1990, which is incorporated herein by reference.

FIGS. 4A through 4D show four designs of a MIMO transmitter capable of implementing various aspects and embodiments of the invention. The invention may also be practiced in an OFDM system that does not utilize MIMO. In this case, the available transmission channels correspond to the frequency subchannels of the OFDM system. In general, the techniques described herein are applicable for multiple parallel transmission channels supported by MIMO, OFDM, or any other communication scheme (e.g., a CDMA scheme) capable of supporting multiple parallel transmission channels.

Numerous other transmitter designs are also capable of implementing various inventive techniques described herein, and these designs are also within the scope of the invention. Some of these transmitter designs are described in further detail in the following patent applications, which are all assigned to the assignee of the present application and incorporated herein by reference:

U.S. patent application Ser. No. 09/776,073, described above;

U.S. patent application Ser. No. 09/532,492, entitled "HIGH EFFICIENCY, HIGH PERFORMANCE COMMUNICATIONS SYSTEM EMPLOYING MULTI-CARRIER MODULATION," filed Mar. 22, 2000;

U.S. patent application Ser. No. 09/816,481, entitled "METHOD AND APPARATUS FOR UTILIZING CHANNEL STATE INFORMATION IN A WIRELESS COMMUNICATION SYSTEM," filed Mar. 23, 2001 and now allowed;

U.S. patent application Ser. No. 09/854,235, entitled "METHOD AND APPARATUS FOR PROCESSING DATA IN A MULTIPLE-INPUT MULTIPLE-OUTPUT (MIMO) COMMUNICATION SYSTEM UTILIZING CHANNEL STATE INFORMATION," filed May 11, 2001 and now allowed;

U.S patent application Ser. Nos. 09/860,274 and 09/881,610, both entitled "METHOD AND APPARATUS FOR PROCESSING DATA FOR TRANSMISSION IN A MULTI-CHANNEL COMMUNICATION SYSTEM USING SELECTIVE CHANNEL INVERSION," filed May 17, 2001 and Jun. 14, 2001, respectively.

These patent applications also describe MIMO processing and CSI processing in further detail.

FIG. 4C shows an embodiment wherein the data for each transmit antenna may be coded and modulated independently based on a coding and modulation scheme selected for that transmit antenna. Analogously, FIG. 4D shows an embodiment wherein the data for each frequency subchannel may be coded and modulated independently based on a coding and modulation scheme selected for that frequency subchannel. In general, all available transmission channels (e.g., all spatial subchannels of all frequency subchannels) may be segregated into any number of groups, and each group may include any number and type of transmission channels. For example, each group may include spatial subchannels, frequency subchannels, or subchannels in both domains.

MIMO Receiver Systems

Figure 5:
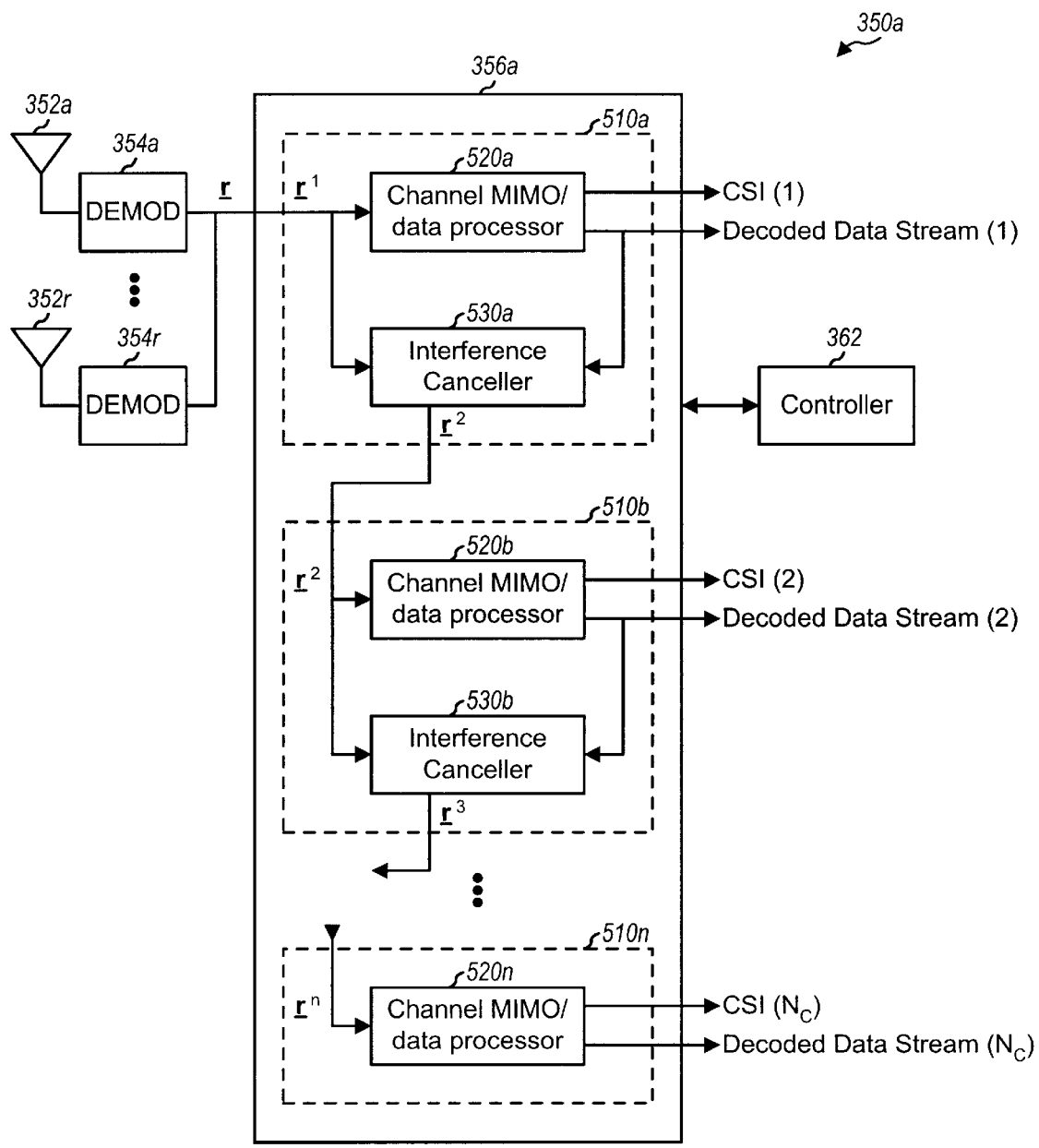
FIG. 5 is a block diagrams of a MIMO receiver system capable of receiving data in accordance with an embodiment of the invention.

FIG. 5 is a block diagram of a MIMO receiver system $350a$ capable of receiving data in accordance with an embodiment of the invention. Receiver system $350a$ is one specific embodiment of receiver system 350 in FIG. 3 and implements a successive cancellation receiver processing technique to receive and recover the transmitted signals. The transmitted signals from (up to) $N_T$ transmit antennas are received by each of $N_R$ antennas $352a$ through $352r$ and routed to a respective demodulator (DEMOD) 354 (which is also referred to as a front-end processor).

Each demodulator 354 conditions (e.g., filters and amplifies) a respective received signal, downconverts the conditioned signal to an intermediate frequency or baseband, and digitizes the downconverted signal to provide samples. Each demodulator 354 may further demodulate the samples with a received pilot to generate a stream of received modulation symbols, which is provided to an RX channel/data processor $356a$.

If OFDM is employed for the data transmission, each demodulator 354 further performs processing complementary to that performed by modulator 322 shown in FIG. 4D. In this case, each demodulator 354 includes an FFT processor (not shown) that generates transformed representations of the samples and provides a stream of modulation symbol vectors. Each vector includes up to $N_F$ modulation symbols for up to $N_F$ frequency subchannels selected for use, and one vector is provided for each time slot. For a transmit processing scheme in which each frequency subchannel is independently processed (e.g., as shown in FIG. 4D), the modulation symbol vector streams from the FFT processors of all $N_R$ demodulators are provided to a demultiplexer (not shown in FIG. 5), which demultiplexes the modulation symbol vector stream from each FFT processor into up to $N_F$ modulation symbol streams corresponding to the number of frequency subchannels used for the data transmission. The demultiplexer then provides each of up to $N_F$ modulation symbol streams to a respective RX MIMO/data processor $356a$.

For a MIMO system not utilizing OFDM, one RX MIMO/data processor $356a$ may be used to process the $N_R$ modulation symbol streams from the $N_R$ received antennas. And for a MIMO system utilizing OFDM, one RX MIMO/data processor $356a$ may be used to process the set of $N_R$ modulation symbol streams from the $N_R$ received antennas for each of up to $N_F$ frequency subchannels used for data transmission. Alternatively, a single RX channel/data processor $356a$ may be used to separately process the set of modulation symbol streams associated with each frequency subchannel.

In the embodiment shown in FIG. 5, RX channel/data processor $356a$ (which is one embodiment of RX channel/data processor 356 in FIG. 3) includes a number of successive (i.e., cascaded) receiver processing stages 510, one stage for each of the transmitted data streams to be recovered by receiver system $350a$. In one transmit processing scheme, selective channel transmission is applied to all available transmission channels. In this case, the selected transmission channels may be used to transmit one or more data streams, each of which may be independently coded with the common coding scheme. In another transmit processing scheme, selective channel transmission is applied independently to each transmit antenna. In this case, the selected transmission channels for each transmit antenna may be used to transmit one or more data streams, each of which may be independently coded with the coding scheme selected for that transmit antenna. If one data stream is independently coded and transmitted on each spatial subchannel, then the successive cancellation receiver processing technique may be used to recover the transmitted data streams. For clarity, RX channel/data processor $356a$ is described for an embodiment wherein one data stream is independently coded and transmitted on each spatial subchannel of a given frequency subchannel being processed by data processor $356a$.

Each receiver processing stage 510 (except for the last stage $510n$) includes a channel MIMO/data processor 520 coupled to an interference canceller 530, and the last stage 510n includes only channel MIMO/data processor 520n. For the first receiver processing stage 510a, channel MIMO/data processor 520a receives and processes the $N_R$ modulation symbol streams from demodulators 354a through 354r to provide a decoded data stream for the first transmission channel (or the first transmitted signal). And for each of the second through last stages 510b through 510n, channel MIMO/data processor 520 for that stage receives and processes the $N_R$ modified symbol streams from the interference canceller 520 in the preceding stage to derive a decoded data stream for the transmission channel being processed by that stage. Each channel MIMO/data processor 520 further provides CSI (e.g., the received SNR) for the associated transmission channel.

For the first receiver processing stage 510a, interference canceller 530a receives the $N_R$ modulation symbol streams from all $N_R$ demodulators 354. And for each of the second through second-to-last stages, interference canceller 530 receives the $N_R$ modified symbol streams from the interference canceller in the preceding stage. Each interference canceller 530 also receives the decoded data stream from channel MIMO/data processor 520 within the same stage, and performs the processing (e.g., coding, interleaving, symbol mapping, channel response, and so on) to derive $N_R$ remodulated symbol streams that are estimates of the interference components in the received modulation symbol streams due to this decoded data stream. The remodulated symbol streams are then subtracted from the received modulation symbol streams to derive $N_R$ modified symbol streams that include all but the subtracted (i.e., canceled) interference components. The $N_R$ modified symbol streams are then provided to the next stage.

As shown in FIG. 5, controller 362 may couple to RX channel/data processor 356a and direct various steps in the successive cancellation receiver processing performed by processor 356a.

FIG. 5 shows a receiver structure that may be used in a straightforward manner when each data stream is transmitted over a respective transmit antenna (i.e., one data stream corresponding to each transmitted signal). In this case, each receiver processing stage 510 may be operated to recover one of the transmitted signals targeted for receiver system 350a and provide the decoded data stream corresponding to the recovered transmitted signal.

For some other transmit processing schemes, a data stream may be transmitted over multiple transmit antennas, frequency subchannels, and/or time intervals to provide spatial, frequency, and time diversity, respectively. For these schemes, the receiver processing initially derives a received modulation symbol stream for the signal transmitted on each transmit antenna of each frequency subchannel. Modulation symbols for multiple transmit antennas, frequency subchannels, and/or time intervals may then be combined and/or multiplexed in a complementary manner as the demultiplexing performed at the transmitter system. The stream of combined modulation symbols is then processed to provide the corresponding decoded data stream.

Figure 6A:
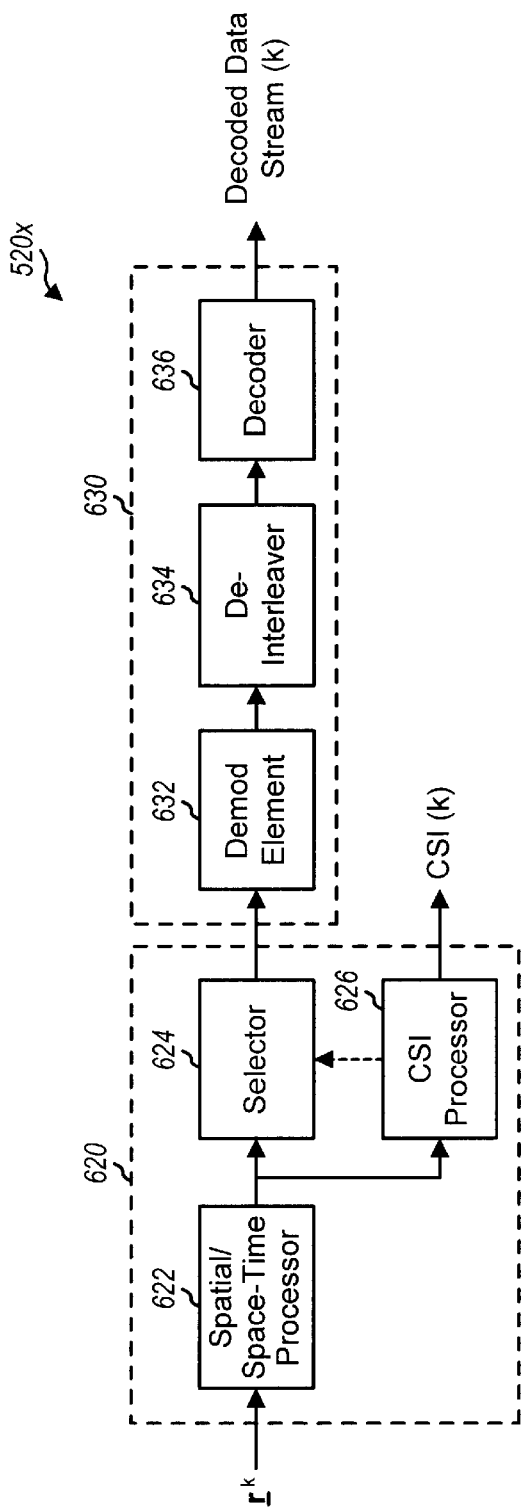
FIGS. 6A and 6B are block diagrams of an embodiment of a channel MIMO/data processor and an interference canceller, respectively, within the MIMO receiver system shown in FIG. 5.

FIG. 6A is a block diagram of an embodiment of channel MIMO/data processor 520x, which is one embodiment of channel MIMO/data processor 520 in FIG. 5. In this embodiment, channel MIMO/data processor 520x includes (1) an RX channel processor 620 that processes the (up to) $N_R$ received modulation symbol streams to provide a recovered modulation symbol stream corresponding to the data stream being recovered and (2) an RX data processor 630 that decodes the recovered modulation symbol stream to provide the decode data stream. RX channel processor 620 includes a spatial/space-time processor 622, a selector 624, and a CSI processor 626, and RX data processor 630 includes a demodulation element 632, a de-interleaver 634, and a decoder 636.

In an embodiment, spatial/space-time processor 622 performs linear spatial processing on the $N_R$ received signals (for a non-dispersive MIMO channel with flat fading) or space-time processing on the $N_R$ received signals (for a dispersive MIMO channel with frequency selective fading). The spatial processing may be achieved using linear spatial processing techniques such as a channel correlation matrix inversion (CCMI) technique, a minimum mean square error (MMSE) technique, and others. These techniques may be used to null out the undesired signals and/or to maximize the received SNR of each of the constituent signals in the presence of noise and interference from the other signals. The space-time processing may be achieved using space-time processing techniques such as an MMSE linear equalizer (MMSE-LE), a decision feedback equalizer (DFE), a maximum-likelihood sequence estimator (MLSE), and others. The CCMI, MMSE, MMSE-LE, and DFE techniques are described in further detail in the aforementioned U.S. patent application Ser. No. 09/854,235. The DFE and MLSE techniques are also described in further detail by S. L. Ariyavistakul et al. in a paper entitled "Optimum Space-Time Processors with Dispersive Interference: Unified Analysis and Required Filter Span," IEEE Trans. on Communication, Vol. 7, No. 7, July 1999, and incorporated herein by reference.

CSI processor 626 determines the CSI for each of the transmission channels used for data transmission. For example, CSI processor 626 may estimate a noise covariance matrix based on the received pilot signals and then compute the SNR of the k-th transmission channel used for the data stream being decoded. The SNR may be estimated similar to conventional pilot assisted single and multi-carrier systems, as is known in the art. The SNRs for all of the selected transmission channels used for data transmission may comprise the CSI that is reported back to the transmitter system. CSI processor 626 may further provide to selector 624 a control signal that identifies the particular data stream to be recovered by this receiver processing stage.

Selector 624 may receive a number of symbol streams from spatial/space-time processor 622 and would then extract some or all of the received modulation symbols to provide the recovered modulation symbol stream corresponding to the data stream to be recovered. The symbol extraction to derive the recovered modulation symbol stream may be performed based on a control signal from CSI processor 626. The extracted stream of modulation symbols is then provided to RX data processor 630.

For an embodiment in which the data stream for each transmission channel is independently coded and modulated based on a common coding and modulation scheme, the recovered modulation symbols for the selected transmission channel are demodulated in accordance with a demodulation scheme (e.g., M-PSK, M-QAM) that is complementary to the common modulation scheme used for the transmission channel. The demodulated data from demodulation element 632 is then de-interleaved by de-interleaver 634 in a complementary manner to that performed by the channel interleaver, and the de-interleaved data is further decoded by decoder 636 in a complementary manner to that performed by the encoder. For example, a Turbo decoder or a Viterbi decoder may be used for decoder 636 if Turbo or convolutional coding, respectively, is performed at the transmitter system. The decoded data stream from decoder 636 represents an estimate of the transmitted data stream being recovered.

Figure 6B:
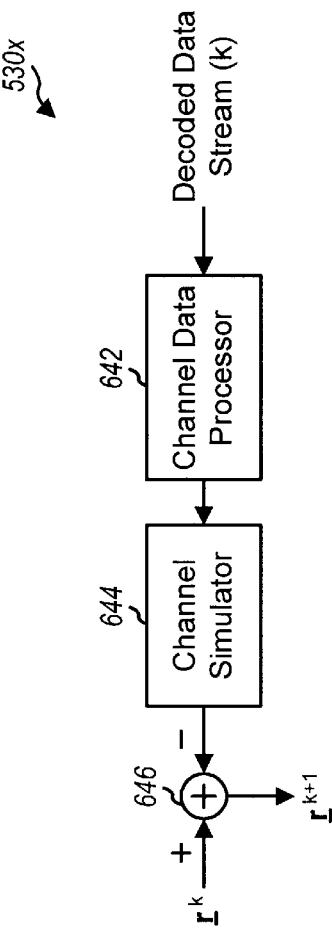

FIG. 6B is a block diagram of an interference canceller 530x, which is one embodiment of interference canceller 530 in FIG. 5. Within interference canceller 530x, the decoded data stream from the channel MIMO/data processor 520 within the same stage is re-encoded, interleaved, and re-modulated by a channel data processor 642 to provide remodulated symbols, which are estimates of the modulation symbols at the transmitter system prior to the MIMO processing and channel distortion. Channel data processor 642 performs the same processing (e.g., encoding, interleaving, and modulation) as that performed at the transmitter system for the data stream. The remodulated symbols are then provided to a channel simulator 644, which processes the symbols with the estimated channel response to provide an estimate, $\hat{\underline{i}}^k$, of the interference due the decoded data stream. The channel response estimate may be derived based on the pilot and/or data transmitted by the transmitter system and, e.g., in accordance with the techniques described in the aforementioned U.S. patent application Ser. No. 09/854,235, now allowed.

The $N_R$ elements in the interference vector $\hat{\underline{i}}^k$ correspond to the component of the received signal at the $N_R$ receive antennas due to the symbol stream transmitted on the k-th transmit antenna. Each element of the interference vector represents an estimated component due to the k-th decoded data stream in a corresponding received modulation symbol stream. These components are interference to the remaining (not yet detected) data streams in the $N_R$ received modulation symbol streams (i.e., the vector $\underline{r}^k$), and are subtracted (i.e., canceled) from the received symbol vector $\underline{r}^k$ by a summer 632 to provide a modified symbol vector $\underline{r}^{k+1}$ having the components from the k-th decoded data stream removed. The modified symbol vector $\underline{r}^{k+1}$ is provided as the input vector to the next receiver processing stage, as shown in FIG. 5.

Various aspects of the successive cancellation receiver processing are described in further detail in the aforementioned U.S. patent application Ser. No. 09/854,235, now allowed.

Figure 7:
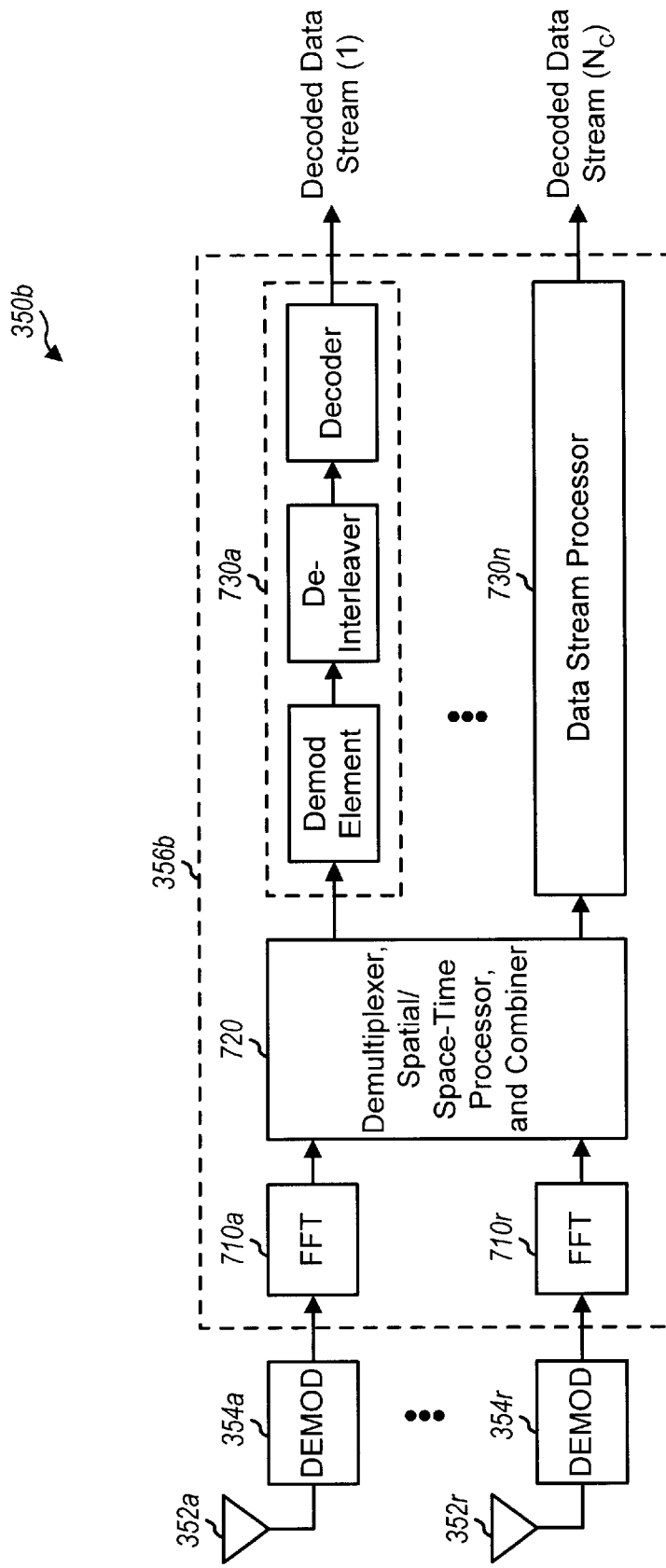
FIG. 7 is a block diagram of a MIMO receiver system capable of receiving data in accordance with another embodiment of the invention.

FIG. 7 is a block diagram of a MIMO receiver system 350b capable of supporting OFDM and receiving data in accordance with another embodiment of the invention. The transmitted signals from (up to) $N_T$ transmit antennas are received by each of $N_R$ antennas 352a through 352r and routed to a respective demodulator 354. Each demodulator 354 conditions, processes, and digitizes a respective received signal to provide samples, which are provided to a RX MIMO/data processor 356b.

Within RX MIMO/data processor 356b, the samples for each receive antenna are provided to a respective FFT processor 710, which generates transformed representations of the received samples and provides a respective stream of modulation symbol vectors. The $N_R$ streams of modulation symbol vectors from FFT processors 710a through 710r are then provided to a processor 720. Processor 720 first demultiplexes the stream of modulation symbol vectors from each FFT processor 710 into a number of (up to $N_F$) subchannel symbol streams. Processor 720 may then perform spatial processing or space-time processing on the $N_R$ subchannel symbol streams of each frequency subchannel to provide (up to) $N_T$ streams of post-processed modulation symbols.

For each data stream transmitted over multiple frequency subchannels and/or multiple spatial subchannels, processor 720 further recombines the post-processed modulation symbols for all frequency and spatial subchannels used for transmitting the data stream into one recovered modulation symbol stream, which is then provided to a data stream processor 730. Each data stream processor 730 receives a particular stream of recovered modulation symbols, performs demodulation, de-interleaving, and decoding complementary to that performed on the stream at the transmitter unit, and provides a respective decoded data stream.

Receiver systems that employ the successive cancellation receiver processing technique and those that do not employ the successive cancellation receiver processing technique may be used to receive, process, and recover the transmitted data streams. Some receiver systems capable of processing singals received over multiple transmission channels are described in the aforementioned U.S. patent application Ser. Nos. 09/532,492, 09/776,073, 09/816,481, now allowed, 09/854,235, now allowed, and 09/860,274.

Obtaining CSI for the Transmitter System

The selective channel transmission may be implemented in various manners, and various types of CSI may be reported by a receiver system to a transmitter system. In one implementation, the characteristics of the communication link are determined at the receiver system and used to select the transmission channels and their coding and modulation scheme(s). The identity of the selected transmission channels and coding and modulation scheme(s) comprise the CSI that is sent back to the transmitter system and used to process data for transmission. In another implementation, the link characteristics are determined at the receiver system and comprise the CSI that is provided to the transmitter system. The transmit system then uses the reported CSI to select the transmission channels and coding and modulation scheme(s).

The CSI that is reported by the receiver system to the transmitter system may thus comprise any type of information that is indicative of (1) the characteristics of the communication link, (2) the selected transmission channels and their coding and modulation scheme(s), or some other information or any combination thereof. Various types and forms of information may be provided as CSI, some examples of which are described below.

In one embodiment, the CSI comprises an indication of all transmission channels that have been selected for use and an indication of the coding and modulation scheme(s) to be used. In one specific implementation, a channel mask may be defined to include a bit for each transmission channel that may be selected for use. Prior to a data transmission, the available transmission channels may be evaluated and selected at the receiver system. The bit for each selected transmission channel may then be enabled (e.g., set to logic high) and the bit for each unselected transmission channel may be disabled (e.g., set to logic low). In another implementation, the selected transmission channels may be identified by run-length coding or some other type of coding. For an OFDM system (with or without MIMO), correlation in the frequency domain may be exploited to permit reduction in the amount of data to be fed back for the CSI. As an example, if M frequency subchannels for a particular spatial subchannel are selected for use, then the following may be reported (1) the identities of the spatial subchannel and the first and last selected frequency subchannels, (2) the identities of the spatial subchannel and the first selected frequency subchannel and M, (3) a specific code indicative of the identities of the spatial subchannel and first selected frequency subchannel and M, or (4) some other values, codes, or messages.

In another embodiment, the CSI comprises a data rate indicator for each independently processed (i.e., coded and modulated) data stream. The quality of a group of one or more transmission channels to be used for transmitting an independently processed data stream may be determined initially (e.g., based on the estimated SNRs for the transmission channels in the group) and a data rate corresponding to the determined channel quality may be identified (e.g., based on a look-up table). The identified data rate is indicative of the maximum data rate that may be transmitted for the data stream for the required level of performance. The data rate may be mapped to and represented by a data rate indicator (DRI), which can be efficiently coded. In a typical implementation, the SNR estimates are mapped directly to the DRI based on, e.g., a look-up table.

In yet another embodiment, the CSI comprises an indication of the particular processing scheme to be used at the transmitter system for each group of selected transmission channels or each independently processed data stream.

In yet another embodiment, the CSI comprises the SNR or channel gain estimated for each selected transmission channel or each independently processed data stream. The SNR or channel gain estimate may be quantized to a value having any number of bits.

In yet another embodiment, the CSI comprises power control information for each selected transmission channel, data stream, group or transmission channels, or any other unit of transmission. The power control information may include a single bit for each transmission unit to indicate a request for either more power or less power, or it may include multiple bits to indicate the magnitude of the change in power level requested. A request for more transmit power would indicate that the received SNR for the associated transmission channel(s) has degraded, and a request for less transmit power would indicate that the received SNR for the associated transmission channel(s) has improved. In one implementation, the transmitter system makes use of the power control information received from the receiver system to estimate the SNR of the associated transmission channel (s), determines which transmission channels to select, and selects the appropriate coding and modulation scheme(s).

In yet another embodiment, the CSI comprises a differential indicator for a particular measure of quality for a transmission channel, a data stream, a group or transmission channels, or some other unit of transmission. Initially, the SNR or DRI or some other quality measurement for the transmission unit is determined and reported as a reference measurement value. Thereafter, monitoring of the quality of the transmission unit continues, and the difference between the last reported measurement and the current measurement is determined. The difference may then be quantized and mapped to a differential indicator, which is then reported. The differential indicator may indicate an increase or decrease to the last reported measurement by a particular step size (or to maintain the last reported measurement). The reference measurement may be transmitted periodically to ensure that errors in the differential indicators and/or erroneous reception of these indicators do not accumulate.

Other types and forms of CSI may also be used and are within the scope of the invention. In general, the CSI includes sufficient information in whatever type and form that may be used to identify a set of selected transmission channels and their coding and modulation scheme(s). The processing to derive certain types and forms of CSI (e.g., the channel mask, data rate indicator, differential indicator, and so on) based on estimates of the channel characteristics may be performed at the receiver system by a controller 362 shown in FIG. 3.

The CSI may be derived based on the signals transmitted from the transmitter system and received at the receiver system. In an embodiment, the CSI is derived based on a pilot reference included in the transmitted signals. Alternatively or additionally, the CSI may be derived based on the data included in the transmitted signals. Although data may be transmitted on only the selected transmission channels, pilot data may be transmitted on unselected transmission channels to allow the receiver system to estimate the channel characteristics.

In yet another embodiment, the CSI comprises one or more signals transmitted from the receiver system to the transmitter system. In some systems, a degree of correlation may exist between the uplink and downlink (e.g. time division duplexed (TDD) systems where the uplink and downlink share the same frequency band in a time division multiplexed manner). In these systems, the quality of the uplink may be estimated (to a requisite degree of accuracy) based on the quality of the downlink, and vice versa, which may be estimated based on signals (e.g., pilot signals) transmitted from the receiver system. The pilot signals would then represent a means by which the transmitter system could estimate the CSI as observed at the receiver system. For this type of CSI, no reporting of channel characteristics is explicitly necessary. CSI for a TDD system is described in further detail in U.S patent application Ser. No. 09/887,225, entitled "METHOD AND APPARATUS FOR TRANSMITTING DATA IN A TIME DIVISION DUPLEXED (TDD) COMMUNICATION SYSTEM," filed Jun. 22, 2001, assigned to the assignee of the present application and incorporated herein by reference.

The signal quality may be estimated at the transmitter system based on various techniques. Some of these techniques are described in the following patents, which are assigned to the assignee of the present application and incorporated herein by reference:

U.S. Pat. No. 5,799,005, entitled "SYSTEM AND METHOD FOR DETERMINING RECEIVED PILOT POWER AND PATH LOSS IN A CDMA COMMUNICATION SYSTEM," issued Aug. 25, 1998;

U.S. Pat. No. 5,903,554, entitled "METHOD AND APPARATUS FOR MEASURING LINK QUALITY IN A SPREAD SPECTRUM COMMUNICATION SYSTEM," issued May 11, 1999;

U.S. Pat. Nos. 5,056,109, and 5,265,119, both entitled "METHOD AND APPARATUS FOR CONTROLLING TRANSMISSION POWER IN A CDMA CELLULAR MOBILE TELEPHONE SYSTEM," respectively issued Oct. 8, 1991 and Nov. 23, 1993; and U.S. Pat. No. 6,097,972, entitled "METHOD AND APPARATUS FOR PROCESSING POWER CONTROL SIGNALS IN CDMA MOBILE TELEPHONE SYSTEM," issued Aug. 1, 2000.

Methods for estimating a single transmission channel based on a pilot signal and/or a data transmission may also be found in a number of papers available in the art. One such channel estimation method is described by F. Ling in a paper entitled "Optimal Reception, Performance Bound, and Cutoff-Rate Analysis of References-Assisted Coherent CDMA Communications with Applications," IEEE Transaction On Communication, October 1999, and incorporated herein by reference.

Various types of information for CSI and various CSI reporting mechanisms are also described in U.S. Pat. No. 6,574,211, entitled "METHOD AND APPARATUS FOR HIGH RATE PACKET DATA TRANSMISSION," filed Nov. 3, 1997 and issued Jun. 3, 2003, assigned to the assignee of the present application, and in "TIE/EIA/IS-856 cdma2000 High Rate Packet Data Air Interface Specification", both of which are incorporated herein by reference.

The CSI may be reported from the receiver system to the transmitter using various CSI transmission schemes. For example, the CSI may be sent in full, differentially, or a combination thereof. In one embodiment, CSI is reported periodically, and differential updates are sent based on the prior transmitted CSI. In another embodiment, the CSI is sent only when there is a change (e.g., if the change exceeds a particular threshold), which may lower the effective rate of the feedback channel. As an example, the channel mask or SNRs may be sent back (e.g., differentially) only when they change. Other compression and feedback channel error recovery techniques to reduce the amount of data to be fed back for CSI may also be used and are within the scope of the invention.

Referring back to FIG. 3, the full/partial CSI, which may comprise the channel characteristics estimated by RX channel/data processor 356 and/or the indication of the selected transmission channels and their coding and modulation scheme(s) determined by controller 362, is provided to a TX data processor 364, which processes the CSI and provides processed data to one or more modulators 354. Modulators 354 further condition the processed data and transmit the CSI back to transmitter system 310 via a reverse channel.

At system 310, the transmitted feedback signal is received by antennas 324, demodulated by demodulators 322, and provided to a RX data processor 332. RX data processor 332 performs processing complementary to that performed by TX data processor 364 and recovers the reported CSI, which is then provided to controller 334.

Controller 334 uses the reported CSI to perform a number of functions including (1) selecting the set of best available transmission channels in each group for data transmission, and (2) determining the coding and modulation scheme to be used for each group of selected transmission channels. Controller 334 may select transmission channels to achieve high throughput or based on some other performance criteria or metrics, and may further determine the threshold used to select the transmission channels, as described above.

The techniques described herein may be used for data transmission on the downlink from a base station to one or more terminals, and may also be used for data transmission on the uplink from each terminal to the base station. For the downlink, transmitter system 310 in FIGS. 3 and 4A through 4D may represent part of a base station and receiver system 350 in FIGS. 3, 5, and 7 may represent part of a terminal. And for the uplink, transmitter system 310 in FIGS. 3 and 4A through 4D may represent part of a terminal and receiver system 350 in FIGS. 3, 5, and 7 may represent part of a base station.

The elements of the transmitter and receiver systems may be implemented with one or more digital signal processors (DSP), application specific integrated circuits (ASIC), processors, microprocessors, controllers, microcontrollers, field programmable gate arrays (FPGA), programmable logic devices, other electronic units, or any combination thereof. Some of the functions and processing described herein may also be implemented with software executed on a processor. Certain aspects of the invention may also be implemented with a combination of software and hardware. For example, computations to determine the threshold α and to select transmission channels may be performed based on program codes executed on a processor (controller 334 or 362 in FIG. 3).

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for processing data for transmission over multiple transmission channels in a multi-channel communication system, comprising:
   estimating characteristics of a plurality of transmission channels available for data transmission;
   segregating the plurality of transmission channels into one or more groups of transmission channels, each group being associated with a particular coding and modulation scheme and a particular threshold used to select transmission channels in the respective group for use for data transmission; and
   for each group of transmission channels,
      selecting one or more transmission channels for use for data transmission based on the estimated channel characteristics and the particular threshold associated with the respective group,
      allocating total transmit power available for the group amongst the one or more selected transmission channels in accordance with a defined allocation scheme,
      coding and modulating data for the one or more selected transmission channels in accordance with the particular coding and modulation scheme associated with the respective group, and
      transmitting the coded and modulated data for each selected transmission channel based on the allocated transmit power.

2. The method of claim 1, wherein the total transmit power available for each group is allocated approximately equally amongst the one or more selected transmission channels in the group.

3. The method of claim 1, wherein the total transmit power available for each group is allocated non-uniformly amongst the one or more selected transmission channels in the group.

4. The method of claim 3, wherein greater amount of transmit power is allocated to transmission channels capable of achieving higher performance.

5. The method of claim 1, wherein the one or more transmission channels in each group are selected based in part on performance achievable with the total transmit power allocated in accordance with the defined allocation scheme.

6. The method of claim 1, further comprising:
   interleaving the data for each group in accordance with an interleaving scheme.

7. The method of claim 6, wherein the data for each group is interleaved across all selected transmission channels in the group.

8. The method of claim 1, wherein the one or more transmission channels in each group are further selected based on a threshold, and wherein the threshold for each group is selected to provide high throughput for the selected transmission channels in the group.

9. The method of claim 1, wherein the one or more transmission channels in each group are further selected based on a threshold, and wherein the threshold for each group is selected to provide a highest possible throughput for the transmission channels available in the group.

10. The method of claim 1, wherein the one or more transmission channels in each group are further selected based on a threshold, and wherein the threshold for each group is a particular target received signal-to-noise-plus-interference ratio (SNR).

11. The method of claim 1, wherein the data for each group is coded and modulated based on a respective coding and modulation scheme selected for the group, and wherein the coding and modulation scheme for each group is selected from among a plurality of possible coding and modulation schemes.

12. The method of claim 1, wherein the multi-channel communication system is an orthogonal frequency division modulation (OFDM) system, and wherein the plurality of transmission channels correspond to a plurality of frequency subchannels.

13. The method of claim 1, wherein the multi-channel communication system is a multiple-input multiple-output (MIMO) communication system, and wherein the plurality of transmission channels correspond to a plurality of spatial subchannels of a MIMO channel.

14. The method of claim 13, wherein the MIMO communication system utilizes OFDM, and wherein the plurality of transmission channels correspond to a plurality of spatial subchannels of a plurality of frequency subchannels.

15. The method of claim 14, wherein each group corresponds to a respective transmit antenna and includes a plurality of transmission channels corresponding to a plurality of frequency subchannels.

16. The method of claim 1, wherein the estimated channel characteristics are channel gains.

17. The method of claim 16, wherein, for each group, transmission channels having power gains greater than or equal to a particular power gain threshold are selected, and wherein the power gains are derived from the channel gains.

18. The method of claim 1, wherein the estimated channel characteristics are received signal-to-noise-plus-interference ratios (SNRs).

19. The method of claim 18, wherein, for each group, transmission channels having SNRs greater than or equal to a particular SNR threshold are selected.

20. A method for controlling data transmission in a multi-channel communication system, comprising:
    receiving a plurality of transmissions from a transmitter via a plurality of transmission channels;
    estimating characteristics of the plurality of transmission channels based on the received transmissions;
    selecting one or more transmission channels for use for data transmission and corresponding coding and modulation scheme based on the estimated channel characteristics; and
    sending channel state information (CSI) to the transmitter indicating the one or more selected transmission channels and the corresponding coding and modulation scheme, and wherein total transmit power available for the plurality of transmission channels is allocated amongst the one or more selected transmission channels in accordance with a defined allocation scheme, and wherein data is transmitted over each selected transmission channel based on the allocated transmit power.

21. The method of claim 20, wherein the defined allocation scheme uniformly distributes the total transmit power amongst the one or more selected transmission channels.

22. The method of claim 20, wherein the CSI comprises a channel mask to identify the one or more selected transmission channels.

23. The method of claim 20, wherein the CSI identifies a particular data rate to be used for the one or more selected transmission channels.

24. The method of claim 20, the CSI comprises differential indicator identifying changes since previously sent CSI.

25. In a multi-channel communication system, a method for selecting transmission channels for use for data transmission, comprising:
    defining a set of code rates, wherein each code rate is selectable for coding data prior to transmission;
    defining a set of setpoints, wherein each setpoint corresponds to a respective code rate and is indicative of a target signal-to-noise-plus-interference ratio (SNR) required for a particular level of performance at the corresponding code rate;
    for each code rate,
        identifying one or more transmission channels for possible use for data transmission, wherein the one or more identified transmission channels achieve the setpoint corresponding to the code rate when total available transmit power is distributed amongst the one or more identified transmission channels in accordance with a defined allocation scheme, and
    selecting the identified transmission channels associated with the code rate having a highest performance in accordance with one or more performance criteria for use for data transmission.

26. The method of claim 25, wherein the defined allocation scheme uniformly distributes the total available transmit power amongst the identified transmission channels.

27. The method of claim 25, wherein the performance metric for each code rate is an overall throughput achievable by the identified transmission channels.

28. A transmitter unit in a multi-channel communication system, comprising:
    a controller operative to receive channel state information (CSI) for a plurality of transmission channels available for use for data transmission, segregate the available transmission channels into one or more groups, each group being associated with a particular coding and modulation scheme and a particular threshold used to select transmission channels in the respective group for use for data transmission, and select one or more available transmission channels in each group for use for data transmission based on the received CSI; and
    a transmit data processor coupled to the controller and operative to receive, code, and modulate data for each group based on a particular coding and modulation scheme to provide modulation symbols, distribute total transmit power available for each group amongst the one or more selected transmission channels in the group in accordance with a defined allocation scheme, and transmit the modulation symbols for each selected transmission channel based on the allocated transmit power.

29. The transmitter of claim 28, wherein the defined allocation scheme uniformly distributes the total available transmit power for each group amongst the one or more selected transmission channels in the group.

30. The transmitter of claim 28, further comprising:
    a transmit channel processor coupled to the transmit data processor and operative to receive and demultiplex the modulation symbols into one or more symbol streams, one symbol stream for each antenna used to transmit the modulation symbols.

31. The transmitter of claim 30, wherein the transmit channel processor is further operative to precondition the modulation symbols based on the received CSI.

32. A receiver unit in a multi-channel communication system, comprising:

a receive data processor operative to process a plurality of transmissions received via a plurality of transmission channels and to estimate characteristics of the plurality of transmission channels based on the processed transmissions;

a controller coupled to the receive data processor and operative to select, based on the estimated channel characteristics, one or more transmission channels for use for data transmission; and a transmit data processor coupled to the controller and operative to transmit channel state information (CSI) for the plurality of transmission channels indicating the one or more selected transmission channels, and wherein total transmit power available for the plurality of transmission channels is allocated amongst the one or more selected transmission channels in accordance with a defined allocation scheme, and wherein data is transmitted to the receiver unit over each selected transmission channel based on the allocated transmit power.

33. The receiver of claim 32, wherein the defined allocation scheme uniformly distributes the total available transmit power amongst the one or more selected transmission channels.

* * * * *